(12) United States Patent
Ichikawa et al.

(10) Patent No.: US 9,853,460 B2
(45) Date of Patent: Dec. 26, 2017

(54) POWER CONVERSION CIRCUIT, POWER TRANSMISSION SYSTEM, AND POWER CONVERSION SYSTEM

(71) Applicant: Murata Manufacturing Co., Ltd., Nagaokakyo-shi, Kyoto-fu (JP)

(72) Inventors: Keiichi Ichikawa, Nagaokakyo (JP); Tatsuya Hosotani, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 194 days.

(21) Appl. No.: 14/944,771

(22) Filed: Nov. 18, 2015

(65) Prior Publication Data

US 2016/0072312 A1    Mar. 10, 2016

Related U.S. Application Data

(63) Continuation of application No. PCT/JP2014/067326, filed on Jun. 30, 2014.

(30) Foreign Application Priority Data

Jul. 8, 2013  (JP) ................ 2013-142357

(51) Int. Cl.
*H02M 3/158* (2006.01)
*H02J 5/00* (2016.01)
(Continued)

(52) U.S. Cl.
CPC .............. *H02J 5/005* (2013.01); *H02J 7/025* (2013.01); *H02M 3/158* (2013.01);
(Continued)

(58) Field of Classification Search
CPC ........................... H02J 50/05; H02M 3/33584
See application file for complete search history.

(56) References Cited

U.S. PATENT DOCUMENTS 7,746,041 B2 * 6/2010 Xu ..................... H02M 1/14
  323/223
8,867,295 B2 * 10/2014 Mera ................ G11C 11/4074
  365/149

(Continued)

FOREIGN PATENT DOCUMENTS

JP  H08-275545 A  10/1996
JP  2001-238463 A  8/2001
(Continued)

OTHER PUBLICATIONS

International Search Report issued for PCT/JP2014/067326, dated Sep. 22, 2014.

(Continued)

*Primary Examiner* — Jeffrey Zweizig
(74) *Attorney, Agent, or Firm* — Arent Fox LLP

(57) ABSTRACT

A power conversion circuit includes multiple input-side capacitors connected in series between input terminals; series circuits composed of high-side switching elements and low-side switching elements connected in parallel to the multiple input-side capacitors; and output-side capacitors connected between nodes and a node. The circuit further includes an output-side inductor connected to the node and a controller that alternately turns on and off the high-side switching elements and the low-side switching elements. Each of the low-side switching elements and the high-side switching elements is a MOSFET and causes current to flow from the low side to the high side using a body diode. Accordingly, there is provided a power conversion circuit that has high conversion efficiency and that is capable of realizing reduction in size, a power transmission system, and a power conversion system.

6 Claims, 19 Drawing Sheets

(51) Int. Cl.
*H02M 3/335* (2006.01)
*H02J 7/02* (2016.01)
*H02M 1/00* (2006.01)

(52) U.S. Cl.
CPC ..... *H02M 3/1582* (2013.01); *H02M 3/33584* (2013.01); *H02M 3/1584* (2013.01); *H02M 2001/0074* (2013.01)

(56) References Cited

U.S. PATENT DOCUMENTS

| | | |
|---|---|---|
| 2012/0262005 A1 | 10/2012 | Camurati et al. |
| 2013/0300210 A1 | 11/2013 | Hosotani |

FOREIGN PATENT DOCUMENTS

| | | |
|---|---|---|
| JP | 2002-352942 A | 12/2002 |
| JP | 2005-079786 A | 3/2005 |
| JP | 2009-531009 A | 8/2009 |
| JP | 2013-162611 A | 8/2013 |
| WO | WO 2012/101907 A1 | 6/2012 |

OTHER PUBLICATIONS

Written Opinion of the International Searching Authority issued for PCT/JP2014/067326, dated Sep. 22, 2014.

\* cited by examiner

US 9,853,460 B2

POWER CONVERSION CIRCUIT, POWER TRANSMISSION SYSTEM, AND POWER CONVERSION SYSTEM

CROSS REFERENCE TO RELATED APPLICATION

The present application is a continuation of PCT/JP2014/067326 filed Jun. 30, 2014, which claims priority to Japanese Patent Application No. 2013-142357, filed Jul. 8, 2013, the entire contents of each of which are incorporated herein by reference.

FIELD OF THE INVENTION

The present invention relates to a compact and high-efficiency power conversion circuit capable of achieving a high voltage conversion ratio and a power conversion system.

BACKGROUND OF THE INVENTION

Power transmission systems adopting a magnetic-field coupling method are known as typical wireless power transmission systems. In such a power transmission system, power is transmitted from a primary coil in a power transmission apparatus to a secondary coil in a power reception apparatus using the magnetic field. Since electromotive force is greatly affected by the magnitude of a magnetic flux passing through each coil when the power is transmitted using the magnetic-field coupling in the power transmission system, the relative positional relationship between the primary coil and the secondary coil is required to have high accuracy. In addition, since the coils are used, it is difficult to reduce the size of the apparatuses.

In contrast, wireless power transmission systems adopting an electric-field coupling method are also known. The wireless power transmission systems adopting the electric-field coupling method are disclosed in, for example, Patent Document 1. In such a wireless power transmission system, power is transmitted from a coupling electrode in a power transmission apparatus to a coupling electrode in a power reception apparatus using the electric field. The accuracy required for the relative positions of the coupling electrodes is relatively low in this method and it is possible to reduce the size and the thickness of the coupling electrodes.

The power transmission apparatus described in Patent Document 1 includes a high-frequency high-voltage generation circuit, a passive electrode, and an active electrode. The power reception apparatus includes a high-frequency high-voltage load circuit, a passive electrode, and an active electrode. The active electrode of the power transmission apparatus is adjacent to the active electrode of the power reception apparatus with a gap interposed therebetween to achieve electric-field coupling between the two electrodes. The passive electrode of the power transmission apparatus, the active electrode of the power transmission apparatus, the active electrode of the power reception apparatus, and the passive electrode of the power reception apparatus are arranged so as to be parallel to each other.

Patent Document 1: Japanese Unexamined Patent Application Publication (Translation of PCT Application) No. 2009-531009.

In the wireless power transmission system adopting the electric-field coupling method described in Patent Document 1, high voltage (about 1,000 V) is applied between the active electrode of the power transmission apparatus and the active electrode of the power reception apparatus. Accordingly, it is necessary for the power reception apparatus side to reduce the high voltage to low voltage (about 10 V). General voltage reduction methods include, for example, voltage conversion using a transformer and voltage conversion using a direct current-direct current (DC-DC) converter. However, there are problems in that it is difficult to reduce the size of the transformer using winding and it is difficult to realize both a high voltage conversion ratio (the voltage reduction from high voltage of about 1,000 V to voltage of about 10 V) using the DC-DC converter in related art and high-efficiency drive.

SUMMARY OF THE INVENTION

In order to resolve the above problems, it is an object of the present invention to provide a compact power conversion circuit having high conversion efficiency and a high voltage conversion ratio (or current conversion ratio) and a power transmission system and a power conversion system including the power conversion circuit.

The present invention provides a power conversion circuit including a first input terminal and a second input terminal through which direct-current voltage is input; multiple three-terminal switching circuits that each include a first input portion, a second input portion, and an output portion and that are connected in series or in parallel between the first input terminal and the second input terminal; an inductive impedance element connected between the output portions of the three-terminal switching circuits and a load; and a switching control unit that performs switching control of the three-terminal switching circuits. Each three-terminal switching circuit includes an input-side capacitor connected between the first input portion and the second input portion; a series circuit that is connected in parallel to the input-side capacitor and that is composed of a high-side switching element and a low-side switching element; and a DC cut element connected between a node between the high-side switching element and the low-side switching element and the output portion. The switching control unit alternately turns on and off the high-side switching element and the low-side switching element in the three-terminal switching circuit.

With the above configuration, since the increase in number of the three-terminal switching circuits increases the voltage conversion ratio (or current conversion ratio), it is possible to realize reduction in size, compared with general step-down converters using transformers in the related art. In addition, the power conversion circuit has the configuration in which the series circuits each composed of the low-side switching element and the high-side switching element are connected in series to each other and the output end is insulated by an element that blocks direct-current components. Accordingly, since it is possible to avoid increase in voltage applied to the low-side switching elements and the high-side switching elements, it is not necessary to use a high-voltage element. Consequently, it is possible to reduce the cost. Non-use of the high-voltage element allows the switching elements having low on-resistance values to be used to reduce the loss. Furthermore, the use of one inductive impedance element for the multiple three-terminal switching circuits reduces the size of the circuit.

The switching control unit preferably has a configuration in which the switching control unit synchronously turns on and off the high-side switching elements in the series circuits in the multiple three-terminal switching circuits and synchronously turns on and off the low-side switching elements in the series circuits in the multiple three-terminal switching circuits.

With the above configuration, since the operations of the multiple three-terminal switching circuits are synchronized with each other, it is possible to further reduce the ripples of the output voltage.

The power conversion circuit preferably has a configuration in which each of the high-side switching element and the low-side switching element is a MOSFET, the high-side switching element includes a high-side diode that causes current to flow from a source of the high-side switching element to a drain thereof and the low-side switching element includes a low-side diode that causes current to flow from a source of the low-side switching element to a drain thereof, and the switching control unit performs zero voltage switching driving of the high-side switching element and the low-side switching element.

With the above configuration, it is possible to reduce switching loss, thereby achieving high conversion ratio.

The power conversion circuit preferably has a configuration in which each of the high-side switching element and the low-side switching element is an n-type MOSFET, and the power conversion circuit includes a driver circuit connected to a gate of the high-side switching element and a bootstrap circuit that supplies drive voltage to the driver circuit.

With the above configuration, it is possible to reduce the size of the power conversion circuit and to ensure reliable driving of the high-side switching elements, compared with a case in which an insulating transformer is used for driving. In addition, it is possible to use the low-loss n-type MOSFET.

The power conversion circuit preferably has a configuration in which the high-side switching element is a p-type MOSFET and the low-side switching element is an n-type MOSFET.

With the above configuration, it is not necessary to use the bootstrap circuit, thereby further simplifying the circuit configuration.

According to the present invention, the increase in number of the three-terminal switching circuits realizes the high efficiency and the reduction in size of the power conversion circuit, compared with general step-down converters using transformers in the related art. In addition, the power conversion circuit has the configuration in which the series circuits each composed of the low-side switching element and the high-side switching element are connected in series to each other and the output end is insulated by an element that blocks direct-current components. Accordingly, since it is possible to avoid increase in voltage applied to the low-side switching elements and the high-side switching elements, it is not necessary to use a high-voltage element. Consequently, it is possible to reduce the cost and the loss.

DETAILED DESCRIPTION OF THE EXEMPLARY EMBODIMENTS

First Embodiment

In a first embodiment, a power conversion circuit according to the present invention will be described, taking a step-down switching circuit as an example.

Figure 1:
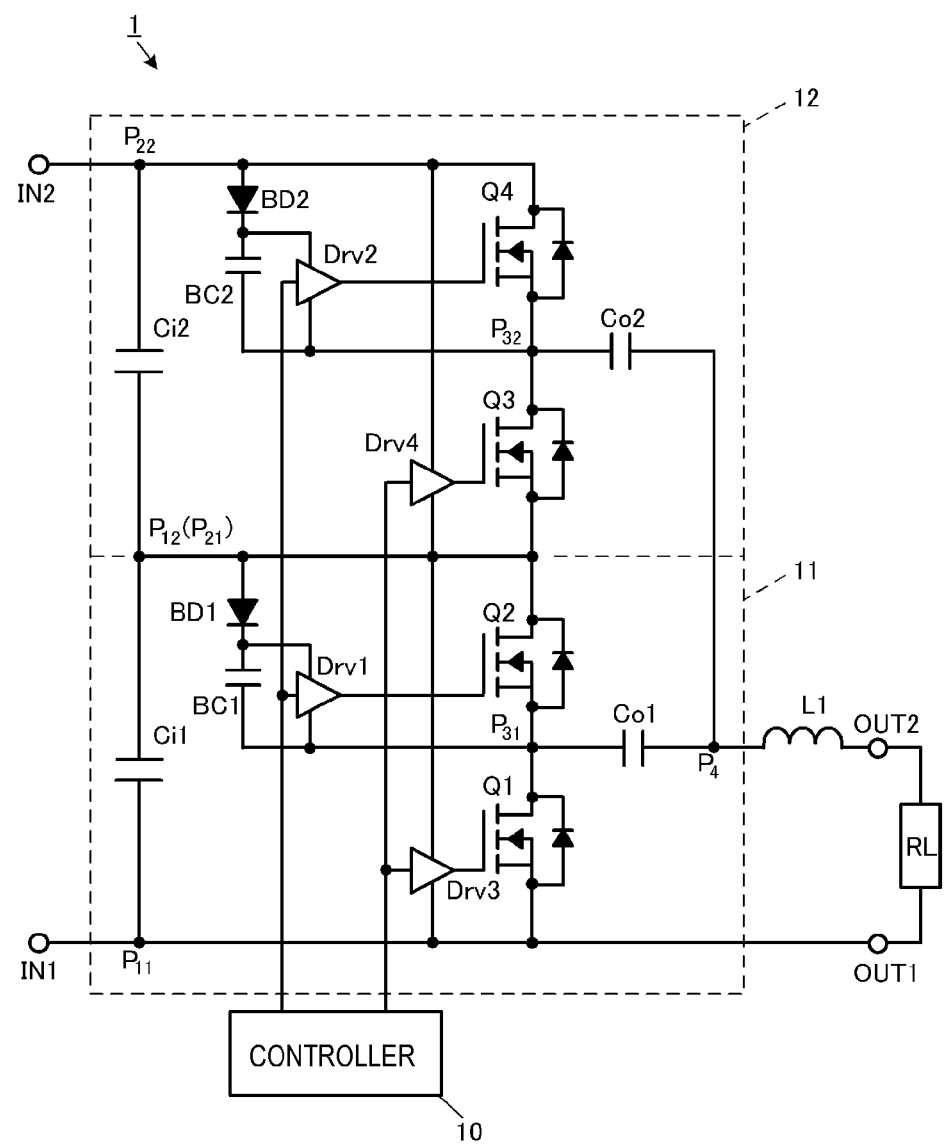
FIG. 1 is an equivalent circuit of a step-down switching circuit according to a first embodiment.

FIG. 1 illustrates a step-down switching circuit according to the first embodiment. A step-down switching circuit 1 according to the present embodiment includes input terminals IN1 and IN2 through which direct-current (DC) voltage is input and output terminals OUT1 and OUT2 through which alternating-current (AC) voltage is output. A load RL is connected between the output terminals OUT1 and OUT2. In the present embodiment, the load RL is an alternating-current load and the step-down switching circuit 1 is used as an inverter apparatus.

Two switching circuit units 11 and 12 are connected in series between the input terminals IN1 and IN2. The switching circuit units 11 and 12 include an input-side capacitor Ci1 and an input-side capacitor Ci2, respectively. The input-side capacitors Ci1 and Ci2 are connected in series between the input terminals IN1 and IN2. Each of the switching circuit units 11 and 12 corresponds to a three-terminal switching circuit according to the present invention.

One end of the input-side capacitor Ci1, which is connected to the input terminal IN1 side, is hereinafter referred to as a node $P_{11}$ and the other end of the input-side capacitor Ci1, which is connected to the switching circuit unit 12, is hereinafter referred to as a node $P_{12}$. One end of the input-side capacitor Ci2, which is connected to the switching circuit unit 11, is hereinafter referred to as a node $P_{21}$ and the other end of the input-side capacitor Ci2, which is connected to the input terminal IN2 side, is hereinafter referred to as a node $P_{22}$. The node $P_{21}$ is equivalent to the node $P_{12}$. Each of the nodes $P_{11}$ and $P_{12}$ corresponds to a first input end. Each of the nodes $P_{21}$ and $P_{22}$ corresponds to a second input end.

The input-side capacitor Ci1 has the same capacitance as that of the input-side capacitor Ci2. When voltage V is applied between the input terminals IN1 and IN2, the input-side capacitors Ci1 and Ci2 are each charged with voltage V/2. In other words, the potential at the node $P_{12}$ ($P_{21}$) between the input-side capacitors Ci1 and Ci2 is equal to V/2 when the voltage at the node $P_{11}$ is reference potential.

Since the switching circuit unit 11 has substantially the same configuration as that of the switching circuit unit 12, the switching circuit unit 11 will be described below and the corresponding reference numerals surrounded by parentheses are illustrated for the switching circuit unit 12.

A series circuit composed of a low-side switching element Q1 (Q3) and a high-side switching element Q2 (Q4) is connected in parallel to the input-side capacitor Ci1 (Ci2). Each of the low-side switching element Q1 (Q3) and the high-side switching element Q2 (Q4) is a Si-based n-type metal oxide semiconductor field effect transistor (MOSFET). A drain of the high-side switching element Q2 (Q4) is connected to the node $P_{12}$ ($P_{22}$) and a source thereof is connected to a drain of the low-side switching element Q1 (Q3). A source of the low-side switching element Q1 (Q3) is connected to the node $P_{11}$ ($P_{21}$). The use of the n-type MOSFETs allows the step-down switching circuit 1 to be further reduced in size, compared with a case in which an insulating transformer is used to reduce the voltage.

Each of the low-side switching element Q1 (Q3) and the high-side switching element Q2 (Q4) includes a body diode. The body diode included in the low-side switching element Q1 (Q3) corresponds to a low-side diode according to the present invention. Each of the low-side switching element Q1 (Q3) and the high-side switching element Q2 (Q4) may be, for example, a bipolar transistor. In this case, diode elements are connected in parallel to the low-side switching element Q1 (Q3) and the high-side switching element Q2 (Q4) in the same orientation as that of the body diodes in FIG. 1.

An output-side capacitors Co1 (Co2) is connected to a node $P_{31}$ ($P_{32}$) between the low-side switching element Q1 (Q3) and the high-side switching element Q2 (Q4). The output-side capacitor Co1 (Co2) is connected to the output terminal OUT2 via an output-side inductor L1. A node between the output-side capacitors Co1 and Co2 and the output-side inductor L1 is hereinafter denoted by $P_4$. The node $P_4$ corresponds to an output end according to the present invention.

Each of the output-side capacitors Co1 and Co2 corresponds to a DC cut element according to the present invention. The output-side inductor L1 corresponds to an inductive impedance element according to the present invention. Each of the output-side capacitors Co1 and Co2 composes an LC resonant circuit with the subsequent output-side inductor L1. In the present embodiment, the use of one output-side inductor L1 for the two output-side capacitors Co1 and Co2 allows the circuit to be reduced in size.

A driver Drv1 (Drv2) is connected to a gate of the high-side switching element Q2 (Q4). A bootstrap circuit for application of drive voltage is connected to the driver Drv1 (Drv2). The bootstrap circuit includes a diode BD1 (BD2) and a capacitor BC1 (BC2). An anode of the diode BD1 (BD2) is connected to the drain of the high-side switching element Q2 (Q4) and a cathode thereof is connected to the node $P_{31}$ ($P_{32}$) via the capacitor BC1 (BC2). The driver Drv1 (Drv2) operates with voltage charged in the capacitor BC1 (BC2) and applies voltage to the gate of the high-side switching element Q2 (Q4) in response to a signal from a controller 10 to drive the high-side switching element Q2 (Q4).

Source potential of the high-side switching element Q2 (Q4) is higher than ground potential. Accordingly, the provision of the bootstrap circuit at the gate of the high-side switching element Q2 (Q4) allows the high-side switching element Q2 (Q4) to be reliably driven.

A driver Drv3 (Drv4) is connected to a gate of the low-side switching element Q1 (Q3). The input-side capacitor Ci1 (Ci2) is connected in parallel to the driver Drv3 (Drv4) to apply the drive voltage.

The controller 10 corresponds to a switching control unit according to the present invention and alternately turns on and off the low-side switching element Q1 (Q3) and the high-side switching element Q2 (Q4).

Figure 2:
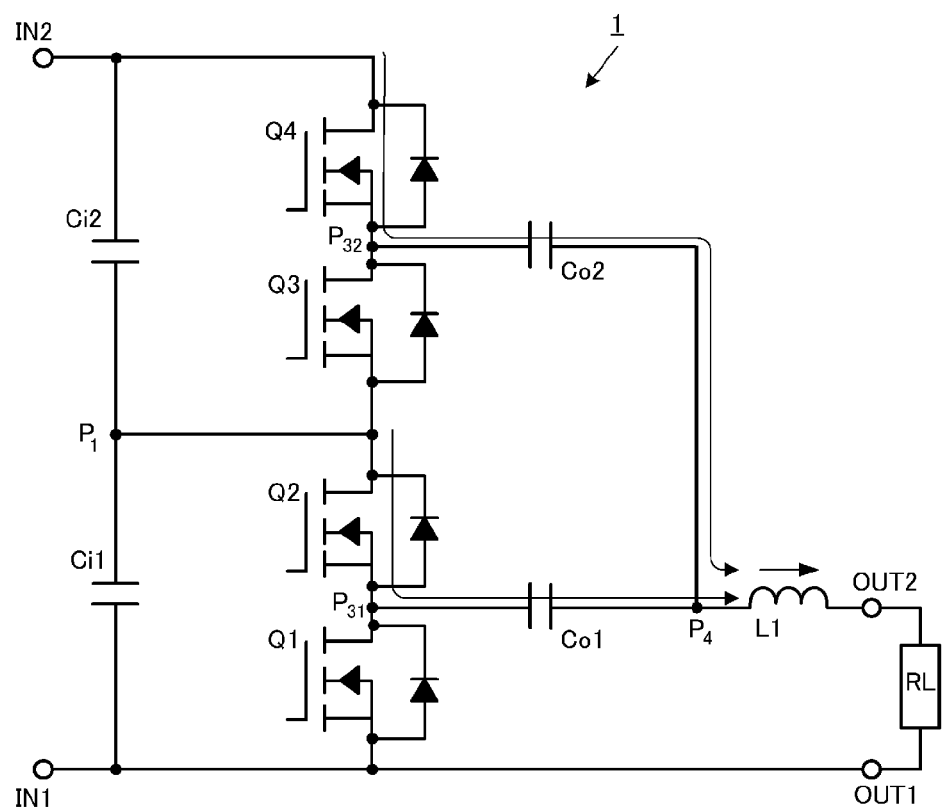
FIG. 2 illustrates paths of current flowing through the step-down switching circuit.
Figure 3:
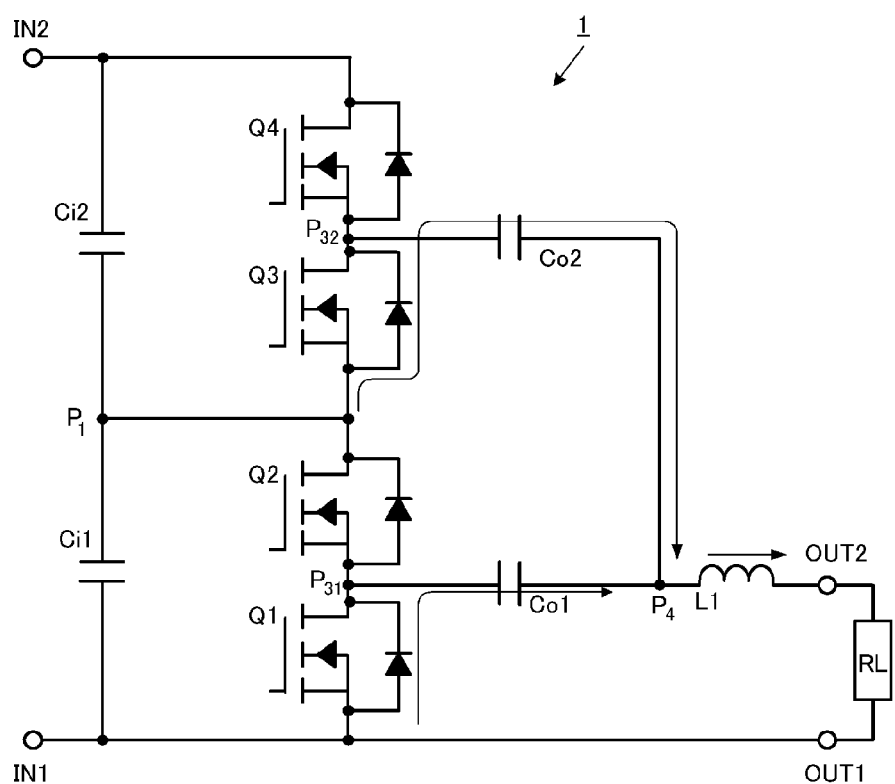
FIG. 3 illustrates paths of the current flowing through the step-down switching circuit.
Figure 4:
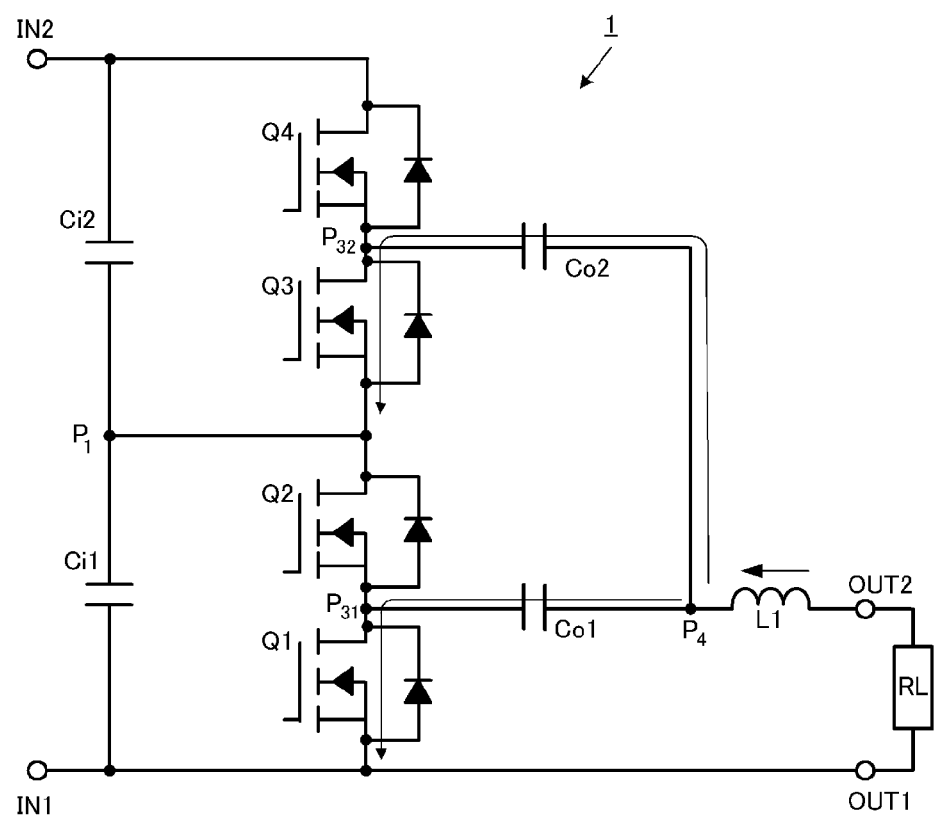
FIG. 4 illustrates paths of the current flowing through the step-down switching circuit.

FIG. 2, FIG. 3, and FIG. 4 illustrate paths of current flowing through the step-down switching circuit 1. The bootstrap circuit and the controller 10 described above with reference to FIG. 1 are not illustrated in FIG. 2, FIG. 3, and FIG. 4. FIG. 2, FIG. 3, and FIG. 4 are circuit diagrams simply illustrating the circuit in FIG. 1. The nodes $P_{12}$ and $P_{21}$ illustrated in FIG. 1 are denoted by a node $P_1$ in FIG. 2, FIG. 3, and FIG. 4.

FIG. 2 illustrates the current paths when the high-side switching elements Q2 and Q4 are turned on and the low-side switching elements Q1 and Q3 are turned off. In this case, current flows from the input terminal IN2 to the output terminal OUT2 through the high-side switching element Q4, the output-side capacitor Co2, and the output-side inductor L1. In addition, current flows from the node $P_1$ to the output terminal OUT2 through the high-side switching element Q2, the output-side capacitor Co1, and the output-side inductor L1. At this time, electrical energy is accumulated in the output-side capacitors Co1 and Co2 and excitation energy is accumulated in the output-side inductor L1.

After the high-side switching elements Q2 and Q4 are turned off, the low-side switching elements Q1 and Q3 are turned on with a short dead time interposed between the turning-off of the high-side switching elements Q2 and Q4 and the turning on of the low-side switching elements Q1 and Q3. FIG. 3 illustrates the current paths at the dead time. The reactances of the capacitors Co1 and Co2 and the output-side inductor L1 are defined so that inductive impedance is generated at a switching frequency when the load RL side is viewed from the nodes $P_{31}$ and $P_{32}$. In other words, the resonant frequency caused by the capacitors Co1 and Co2 and the output-side inductor L1 is set to be lower than the switching frequency. Accordingly, after the high-side switching elements Q2 and Q4 are turned off, current attempts to continue to flow due to the output-side inductor L1. As a result, current flows from the body diode of the low-side switching element Q3 to the output-side inductor L1 through the output-side capacitor Co2. In addition, current flows from the body diode of the low-side switching element Q1 to the output-side inductor L1 through the output-side capacitor Co1.

FIG. 4 illustrates the current paths when the high-side switching elements Q2 and Q4 are turned off and the low-side switching elements Q1 and Q3 are turned on. At this time, current flows from the output-side inductor L1 to the low-side switching element Q3 through the output-side capacitor Co2 with the electrical energy accumulated in the output-side capacitor Co2. In addition, current flows from the output-side inductor L1 to the low-side switching element Q1 through the output-side capacitor Co1 with the electrical energy accumulated in the output-side capacitor Co1.

Figure 5:
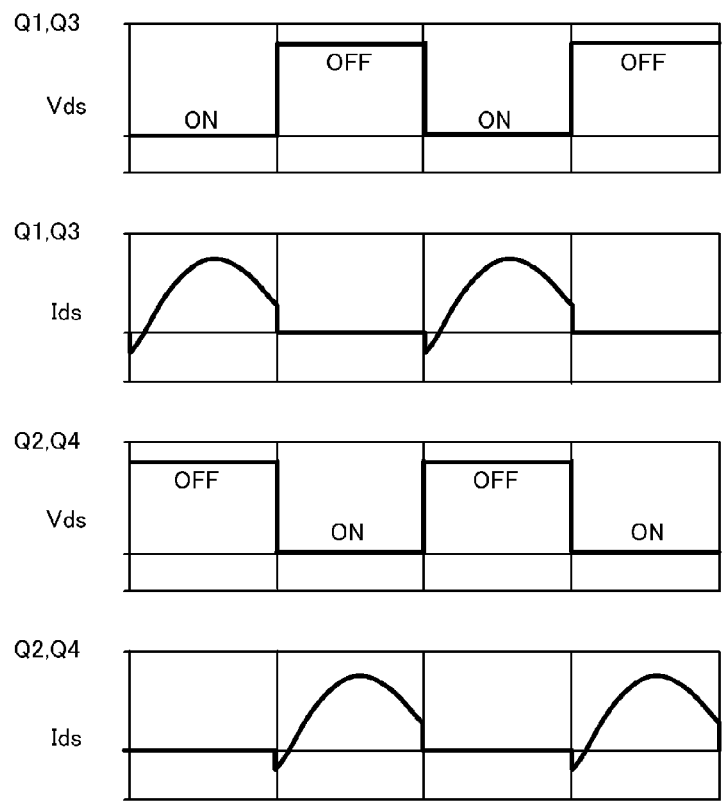
FIG. 5 includes waveform diagrams of drain-source voltage and drain current of low-side switching elements and drain-source voltage and drain current of high-side switching elements.

FIG. 5 includes waveform diagrams of drain-source voltage Vds and drain current Ids of the low-side switching elements Q1 and Q3 and drain-source voltage Vds and drain current Ids of the high-side switching elements Q2 and Q4. The low-side switching elements Q1 and Q3 and the high-side switching elements Q2 and Q4 are turned on and off with the dead time interposed therebetween although the alternate turning on and off of the low-side switching elements Q1 and Q3 and the high-side switching elements Q2 and Q4 is not illustrated in FIG. 5 in detail.

After the high-side switching elements Q2 and Q4 are turned off, voltage is applied to the gate terminals of the low-side switching elements Q1 and Q3 with the dead time interposed between the turning off of the high-side switching elements Q2 and Q4 and the application of the voltage. Then, the low-side switching elements Q1 and Q3 are turned on. At this time, the current flowing through the output-side inductor L1 passes through the body diodes of the low-side switching elements Q1 and Q3. In other words, the drain current Ids when the low-side switching elements Q1 and Q3 are turned on is negative current. Accordingly, the low-side switching elements Q1 and Q3 are turned on through a zero voltage switching (ZVS) operation. The ZVS operation reduces switching loss to achieve high conversion efficiency. The waveform of the drain current through the low-side switching elements Q1 and Q3 is equal to the waveform of resonance current caused by the output-side capacitors Co1 and Co2 and the output-side inductor L1.

Similarly, after the low-side switching elements Q1 and Q3 are turned off, voltage is applied to the gate terminals of the high-side switching elements Q2 and Q4 with the dead time interposed between the turning-off of the low-side switching elements Q1 and Q3 and the application of the voltage. Then, the high-side switching elements Q2 and Q4 are turned on. At this time, the current flowing through the output-side inductor L1 passes through the body diodes of the high-side switching elements Q2 and Q4. In other words, the drain current when the high-side switching elements Q2 and Q4 are turned on is negative current, as illustrated by a solid line in FIG. 5. Accordingly, the high-side switching elements Q2 and Q4 are turned on through the zero voltage switching operation. The ZVS operation reduces the switching loss to achieve the high conversion efficiency.

Figure 6:
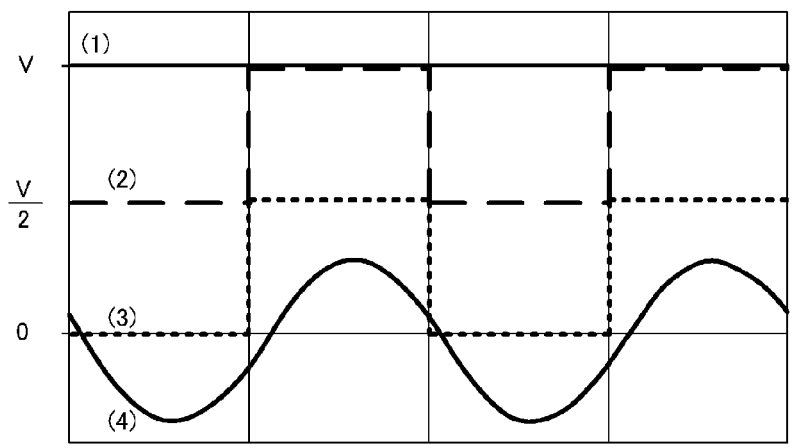
FIG. 6 illustrates voltage waveforms at positions in the step-down switching circuit.

FIG. 6 illustrates voltage waveforms at positions in the step-down switching circuit 1. The waveforms illustrated in FIG. 6 are results of simulation performed under the following conditions: the input voltage through the input terminals IN1 and IN2=100 V, the input-side capacitors Ci1 and Ci2=10 μF, the output-side capacitors Co1 and Co2=20 nF, and the output-side inductor L1=68 μH in FIG. 1. The drive frequency of the switching elements Q1 to Q4 is equal to 100 kHz.

A waveform (1) in FIG. 6 illustrates a voltage waveform between the input terminals IN1 and IN2, a waveform (2) in FIG. 6 illustrates a voltage waveform at the node $P_{32}$ between the low-side switching element Q3 and the high-side switching element Q4, a waveform (3) in FIG. 6 illustrates a voltage waveform at the node $P_{31}$ between the low-side switching element Q1 and the high-side switching element Q2, and a waveform (4) in FIG. 6 illustrates a voltage waveform at both ends of the load RL.

It is assumed that the voltage of the waveform (1) in FIG. 6 is equal to the voltage V, as described above. In this case, as illustrated by the waveform (2), the voltage at the node $P_{32}$ when the high-side switching element Q4 is turned on is substantially equal to V. The voltage at the node $P_{32}$ when the low-side switching element Q3 is turned on is about V/2. As illustrated by the waveform (3), the voltage at the node $P_{31}$ when the high-side switching element Q2 is turned on is equal to the voltage at the node $P_1$, that is, is about V/2. The voltage at the node $P_{31}$ when the low-side switching element Q1 is turned on is substantially equal to zero. As illustrated by the waveform (2) and the waveform (3), the voltage at the node $P_{31}$ is varied at amplitude of V/2 with the reference voltage set to zero and the voltage at the node $P_{32}$ is varied at amplitude of V/2 with the reference voltage set to V/2.

The voltage at the node $P_4$ is voltage that results from cutting DC bias from the voltage at the node $P_{31}$ or $P_{32}$ by the output-side capacitor Co1 or Co2 and that has passed through the inductor L1. In other words, the voltage at the node $P_4$ resonates, as illustrated by the waveform (4), and has a sinusoidal voltage waveform around the voltage zero.

As described above, in the step-down switching circuit 1 according to the first embodiment, the use of the MOSFETs allows the step-down switching circuit 1 to be reduced in size and to achieve low profile. In addition, since part of the input voltage is applied to the low-side switching elements Q1 and Q3 and the high-side switching elements Q2 and Q4, it is not necessary to use a high-voltage element. Furthermore, the use of the output-side inductor L1 for both of the switching circuit units 11 and 12 eliminates the necessity to increase the number of inductors to reduce the size of the step-down switching circuit 1.

Although the two switching circuit units are used in the example in the first embodiment, use of the step-down switching circuit composed of the switching circuit units of three or more number supports the voltage conversion ratio of a wider range. Although the example in which the duty ratio of each switching element is close to 50% is described above, the duty ratio may be set to a value lower than 50% to decrease the output voltage or the duty ratio may be fixed to a value near 50% to vary the switching period, thereby varying the frequency of the output voltage.

Figure 7:
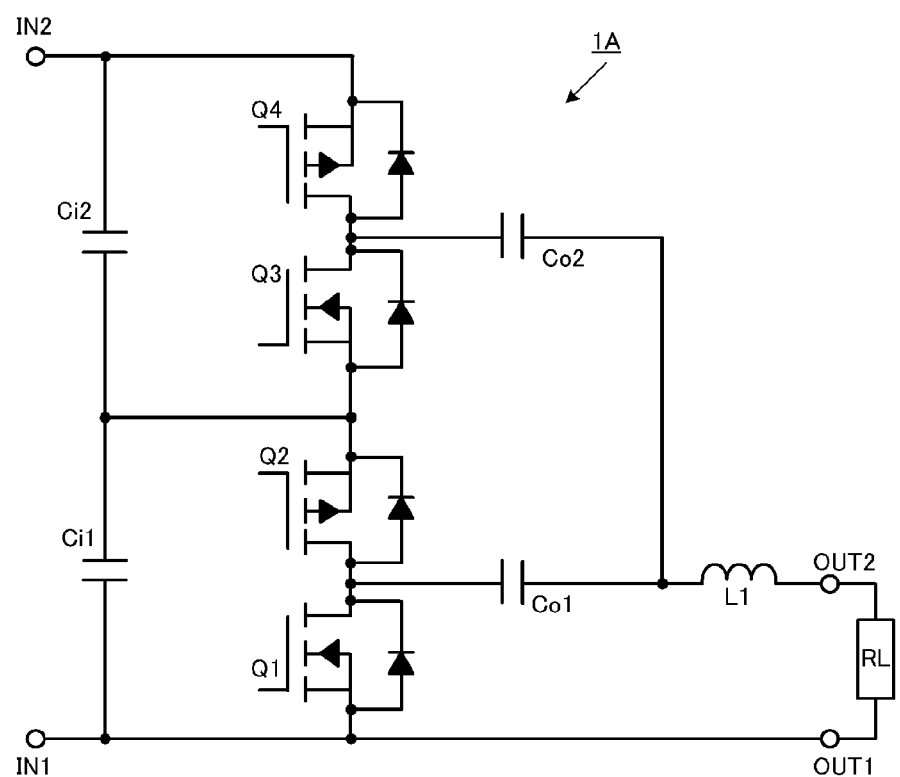
FIG. 7 illustrates an exemplary modification of the step-down switching circuit according to the first embodiment.

FIG. 7 illustrates an exemplary modification of the step-down switching circuit according to the first embodiment. In the example in FIG. 7, each of the high-side switching elements Q2 and Q4 in a step-down switching circuit 1A is a Si-based p-type MOSFET. In this case, the bootstrap circuit for driving the high-side switching elements Q2 and Q4 is not required. Accordingly, it is possible to simplify the circuit configuration, compared with the case in FIG. 1.

Although each of the low-side switching elements Q1 and Q3 and the high-side switching elements Q2 and Q4 is the MOSFET including the body diode in the present embodiment, each of the switching elements Q1 to Q4 may be a GaN-based MOSFET or a SiC-based MOSFET. When each of the switching elements Q1 to Q4 is the GaN-based MOSFET, the step-down switching circuit may have a configuration in which a diode, which is an actual component, is further connected between the drain and the source of the GaN-based MOSFET in order to realize the zero voltage switching (ZVS) operation.

Second Embodiment

Figure 8:
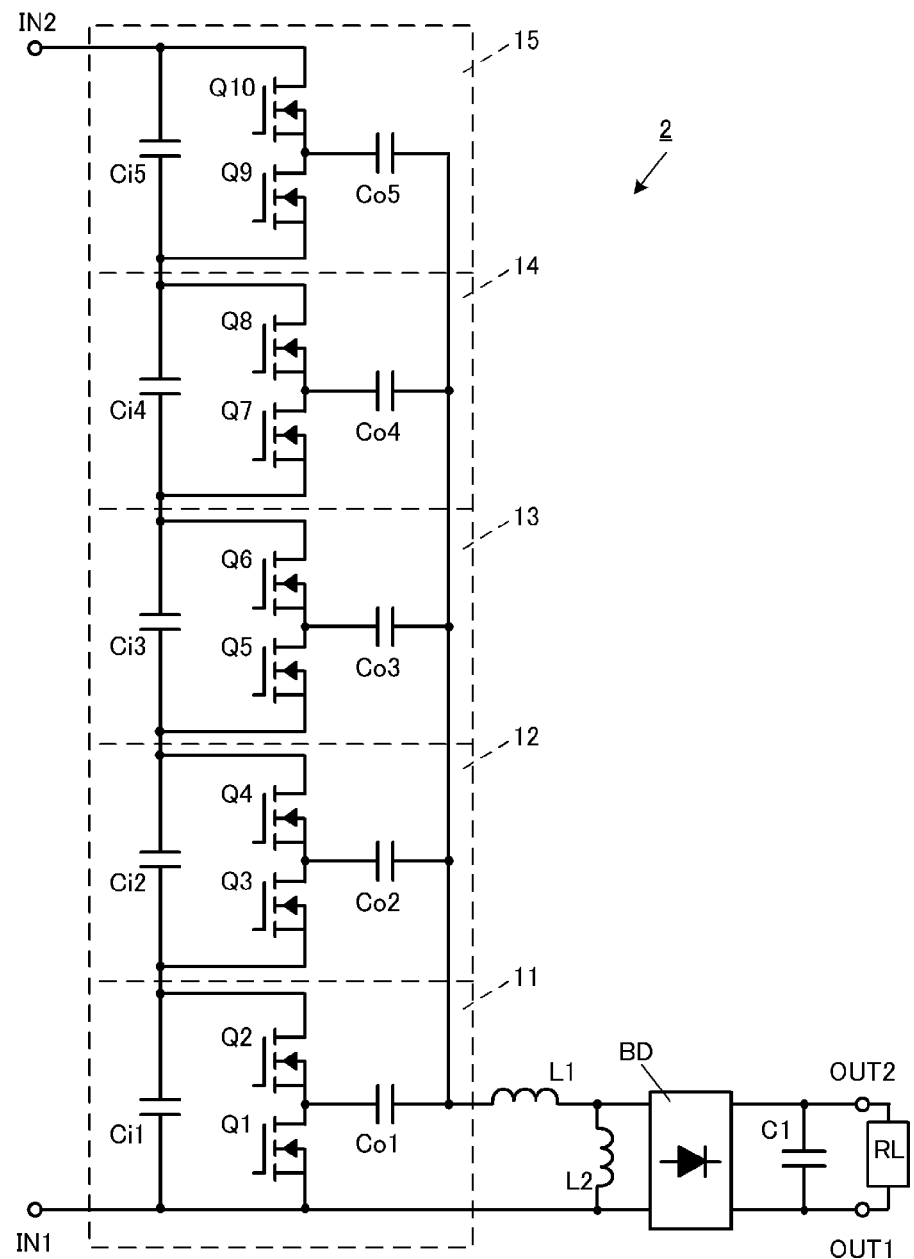
FIG. 8 is an equivalent circuit diagram of a step-down switching circuit according to a second embodiment.

FIG. 8 is a circuit diagram of a step-down switching circuit 2 according to a second embodiment. The second embodiment differs from the first embodiment in the number of switching circuit units. The load RL connected to the output terminals OUT1 and OUT2 in the step-down switching circuit 2 according to the present embodiment is a direct-current load and the step-down switching circuit 2 is a DC-DC converter.

The step-down switching circuit 2 includes five switching circuit units 11, 12, 13, 14, and 15 connected in series to each other. In the switching circuit units 11, 12, 13, 14, and 15, the input-side capacitor Ci1 is connected in parallel to the low-side switching element Q1 and the high-side switching element Q2, which are connected in series to each other; the input-side capacitor Ci2 is connected in parallel to the low-side switching element Q3 and the high-side switching element Q4, which are connected in series to each other; an input-side capacitor Ci3 is connected in parallel to a low-side switching element Q5 and a high-side switching element Q6, which are connected in series to each other; an input-side capacitor Ci4 is connected in parallel to a low-side switching element Q7 and a high-side switching element Q8, which are connected in series to each other; and an input-side capacitor Ci5 is connected in parallel to a low-side switching element Q9 and a high-side switching element Q10, which are connected in series to each other.

A node between the low-side switching element Q1 and the high-side switching element Q2 is connected to the output-side inductor L1 via the output-side capacitor Co1, a node between the low-side switching element Q3 and the high-side switching element Q4 is connected to the output-side inductor L1 via the output-side capacitor Co2, a node between the low-side switching element Q5 and the high-side switching element Q6 is connected to the output-side inductor L1 via an output-side capacitor Co3, a node between the low-side switching element Q7 and the high-side switching element Q8 is connected to the output-side inductor L1 via an output-side capacitor Co4, and a node between the low-side switching element Q9 and the high-side switching element Q10 is connected to the output-side inductor L1 via an output-side capacitor Co5. The output-side inductor L1 is connected to a bridge diode BD, which functions as a rectifier circuit. An inductor L2, which is used as a current path when the load RL is a high load or is open, is connected in parallel to the input side of the bridge diode BD and a capacitor C1, which functions as a smoothing circuit, is connected in parallel to the output side of the bridge diode BD. Direct-current voltage input through the input terminals IN1 and IN2 is reduced and the direct-current voltage is output through the output terminals OUT1 and OUT2.

In the step-down switching circuit 2, the low-side switching elements Q1, Q3, Q5, Q7, and Q9 are simultaneously turned on and off and the high-side switching elements Q2, Q4, Q6, Q8, and Q10 are simultaneously turned on and off, as in the first embodiment.

Since the paths of current flowing in response to the turning on and off of the low-side switching elements and the high-side switching elements in the step-down switching circuit 2 are the same as those in the first embodiment, a description of the current paths is omitted herein. In the above configuration, upon input of the direct-current voltage of the voltage V, the step-down switching circuit 2 rectifies and smooths the direct-current voltage, reduces the direct-current voltage to a voltage of V/5 or lower, and outputs the direct-current voltage through the output terminals OUT1 and OUT2.

As described above, the step-down switching circuit 2 according to the second embodiment is capable of achieving a higher voltage conversion ratio (step-down ratio), compared with the first embodiment, by increasing the numbers of the input-side capacitors, the low-side switching elements, the high-side switching elements, and the output-side capacitors.

Figure 9:
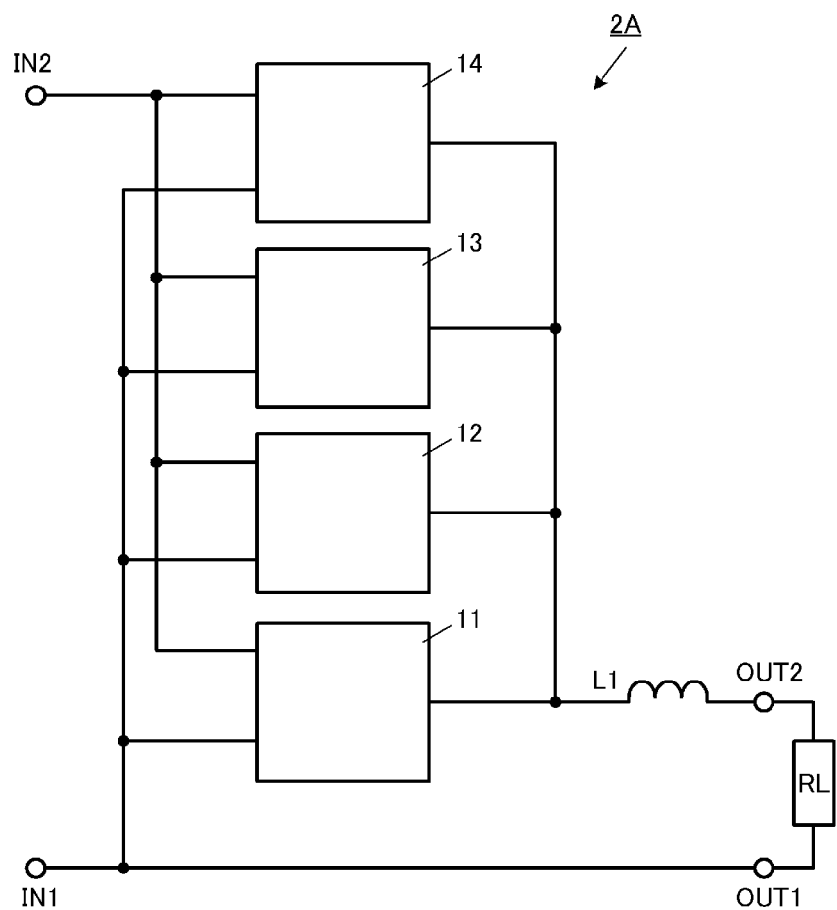
FIG. 9 illustrates an exemplary modification of the step-down switching circuit in which the number and the connection mode of switching circuit units are varied.

Although the configuration in which the five switching circuit units are connected in series to each other is exemplified in the present embodiment, the number of the switching circuit units and the connection mode (serial connection or parallel connection) of the switching circuit units may be appropriately varied. FIG. 9 illustrates an exemplary modification of the step-down switching circuit in which the number and the connection mode of the switching circuit units are varied.

A step-down switching circuit 2A illustrated in FIG. 9 includes four switching circuit units 11 to 14 connected in parallel to each other. Although a detailed circuit diagram of the four switching circuit units 11 to 14 is omitted in FIG. 9, the configuration of each of the four switching circuit units 11 to 14 is the same as the one described above with reference to FIG. 8. The drain of the high-side switching element in each of the switching circuit units 11 to 14 is connected to the input terminal IN2 and the source of the low-side switching element in each of the switching circuit units 11 to 14 is connected to the input terminal IN1. In this case, large current is capable of being generated from the step-down switching circuit 2A. In addition, even if any of the switching circuit units 11 to 14 fails, the step-down switching circuit 2A is capable of being normally operated to realize the step-down switching circuit 2A having a fail-safe function.

Third Embodiment

Figure 10:
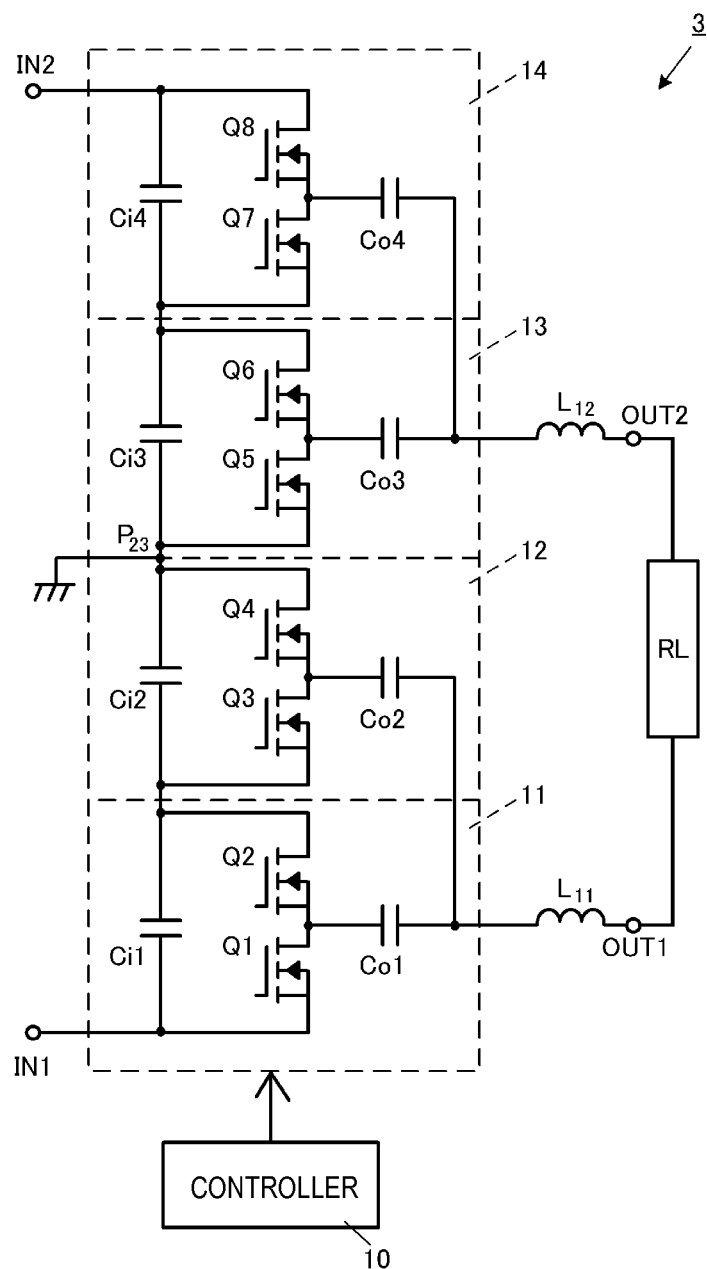
FIG. 10 is an equivalent circuit diagram of a step-down switching circuit according to a third embodiment.

In a third embodiment, an example in which the switching circuit units are controlled in opposite phase will be described. FIG. 10 is a circuit diagram of a step-down switching circuit 3 according to the third embodiment. The step-down switching circuit 3 according to the third embodiment includes four switching circuit units 11 to 14 connected in series to each other. The switching circuit units 11 and 12 are connected to the output terminal OUT1 via an output-side inductor $L_{11}$. The switching circuit units 13 and 14 are connected to the output terminal OUT2 via an output-side inductor $L_{12}$. In this configuration, the load RL connected to the output terminals OUT1 and OUT2 is insulated from the ground and a node $P_{23}$ between the switching circuit unit 12 and the switching circuit unit 13 is grounded.

Figure 11:
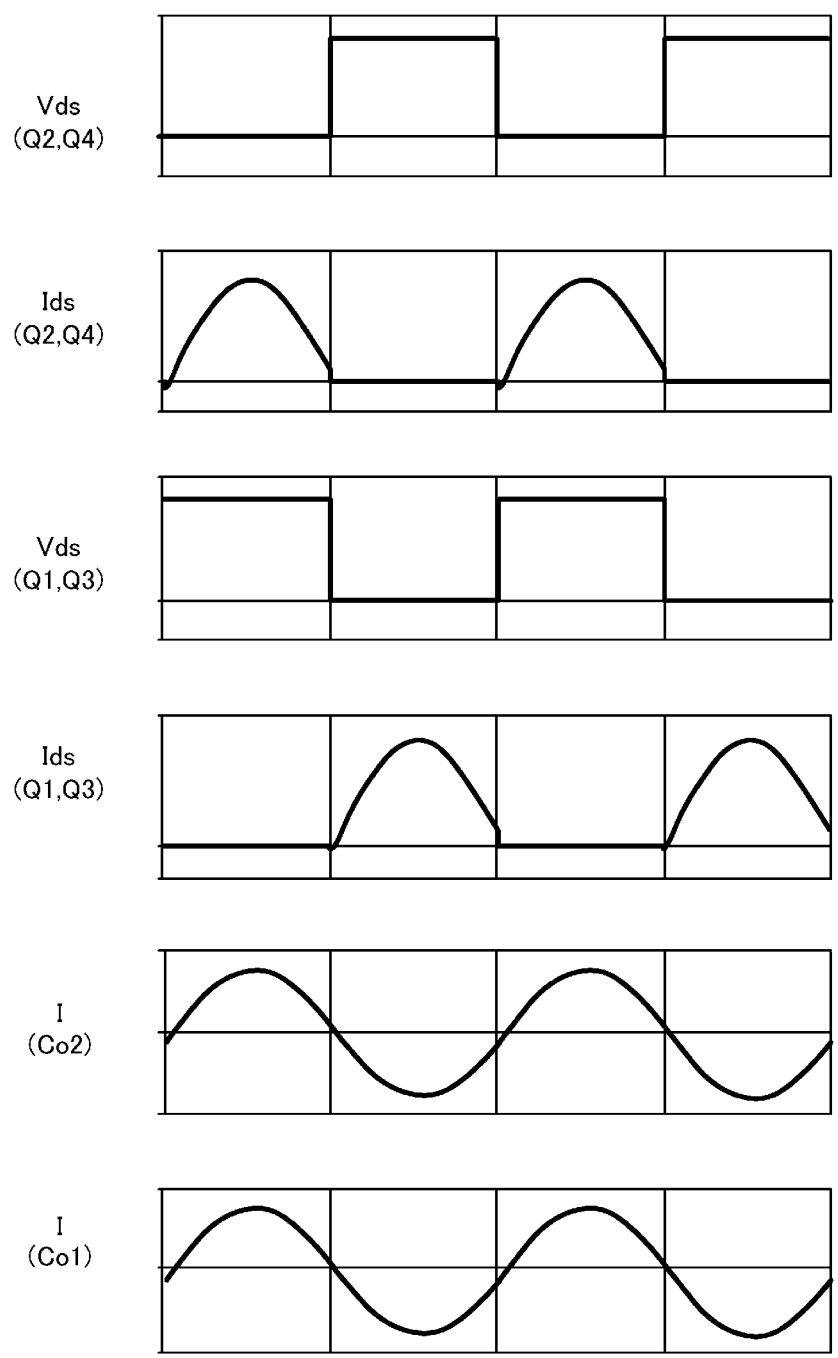
FIG. 11 illustrates waveforms of drain-source voltage Vds and drain-source current Ids of the respective switching elements and output current from output-side capacitors.
Figure 12:
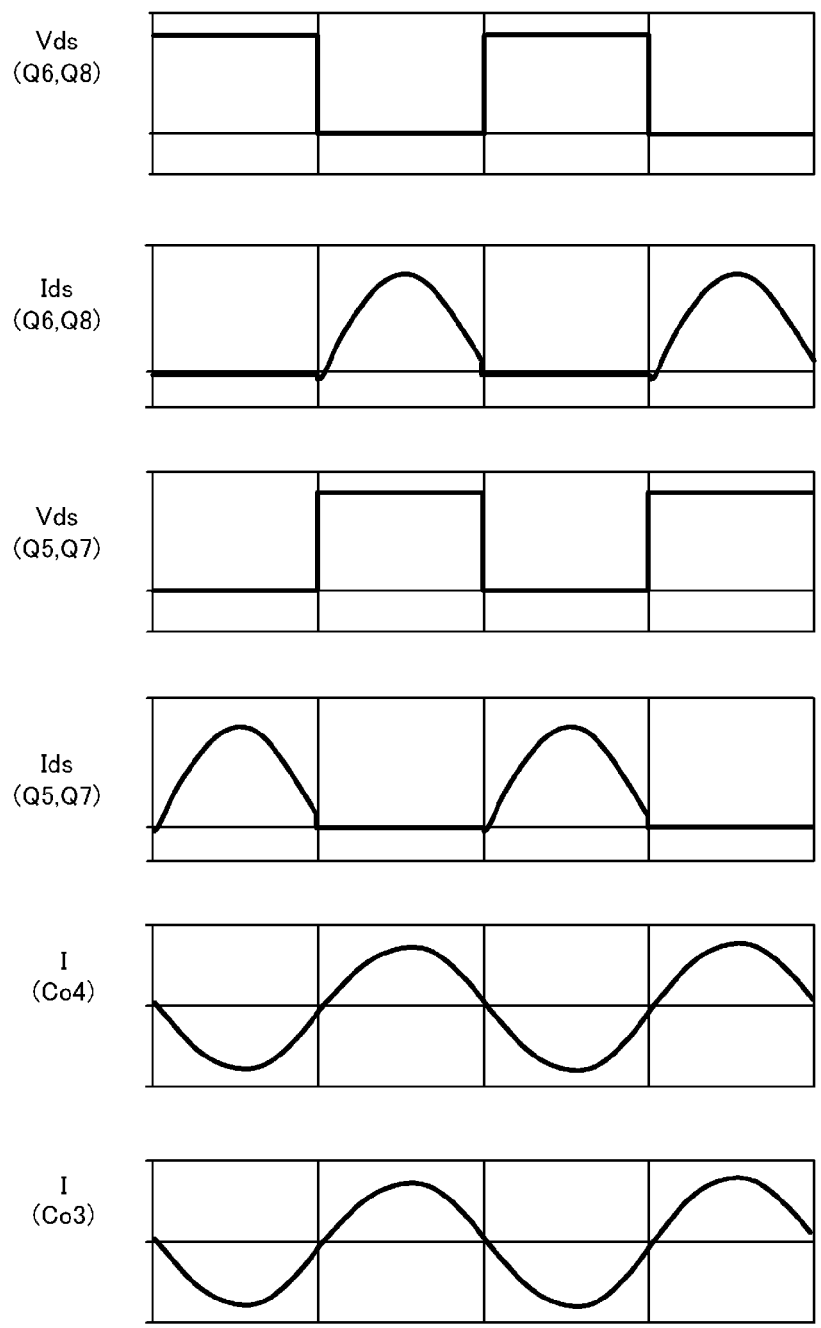
FIG. 12 illustrates waveforms of drain-source voltage Vds and drain-source current Ids of the respective switching elements and output current from output-side capacitors.

In addition, the step-down switching circuit 3 includes a controller 10 that performs switching control. The controller 10 performs the switching control of the switching circuit units 11 and 12 out of phase with the switching control of the switching circuit units 13 and 14 by 180°. FIG. 11 and FIG. 12 illustrate waveforms of the drain-source voltage Vds and the drain-source current Ids of the respective switching elements and output current from the output-side capacitors.

In the third embodiment, the high-side switching elements Q2 and Q4 in the switching circuit units 11 and 12, respectively, and the low-side switching elements Q5 and Q7 in the switching circuit units 13 and 14, respectively, are simultaneously turned on and off. The low-side switching elements Q1 and Q3 in the switching circuit units 11 and 12, respectively, and the high-side switching elements Q6 and Q8 in the switching circuit units 13 and 14, respectively, are simultaneously turned on and off.

Also in the third embodiment, the voltage is capable of being reduced to about half of the input voltage or less, as in the first embodiment, and the use of the multiple switching circuit units allows a higher voltage conversion ratio (step-down ratio) to be achieved, compared with general step-down converters using transformers or the likes in the related art. Since the step-down switching circuit 3 has a symmetric configuration and the node $P_{23}$ is grounded, it is possible to reduce the noise, compared with asymmetric circuit configurations.

Figure 13:
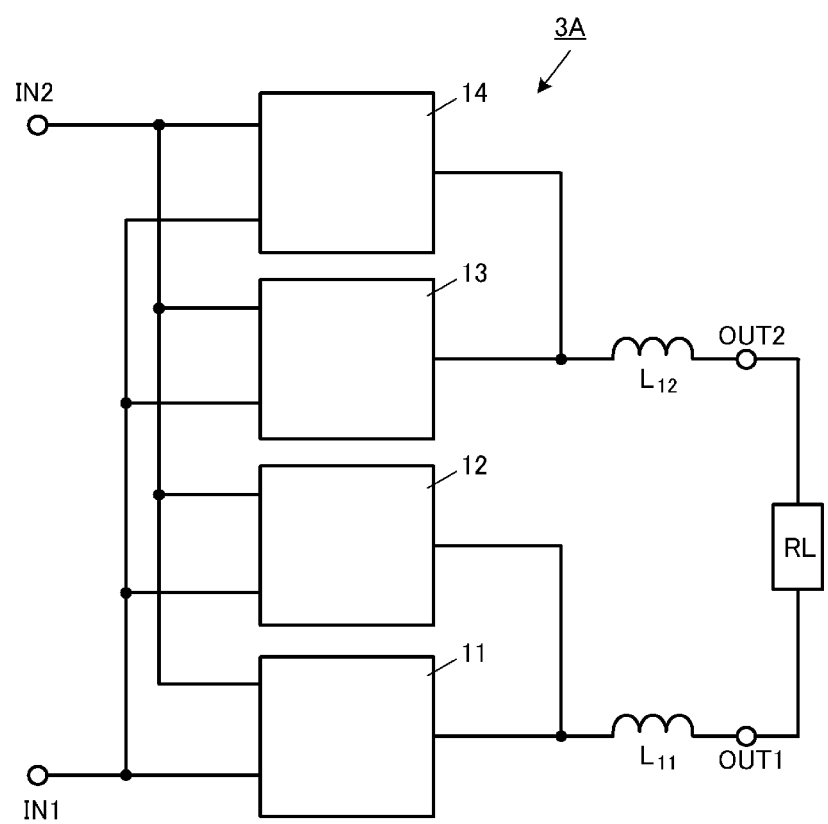
FIG. 13 illustrates an exemplary modification of the step-down switching circuit in which the connection mode of the switching circuit units is varied.
Figure 14:
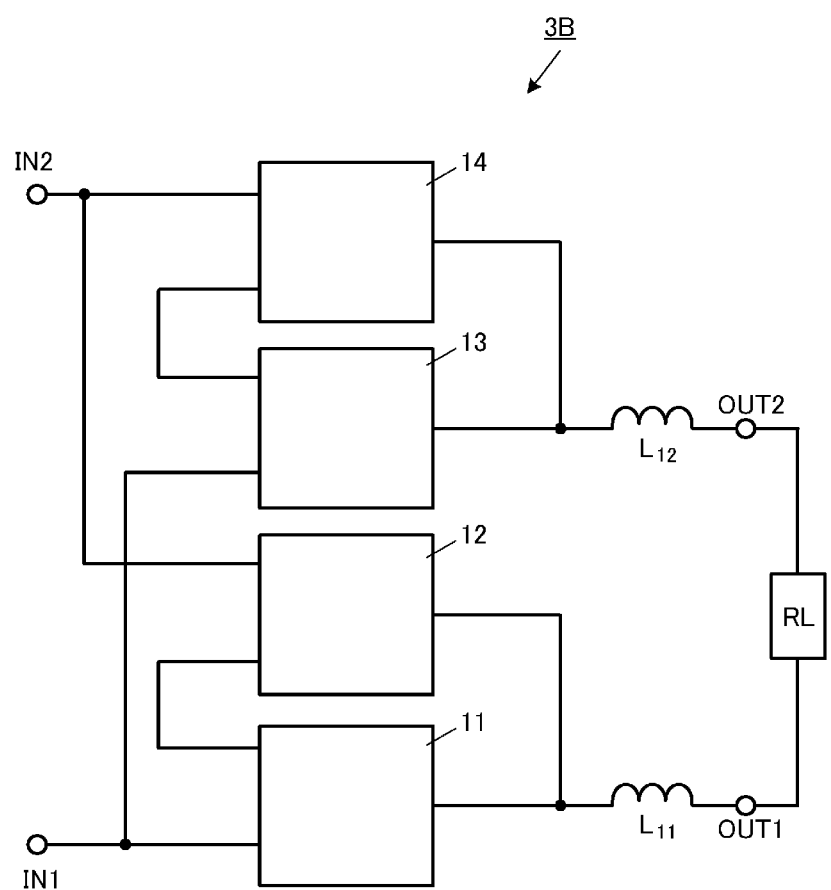
FIG. 14 illustrates an exemplary modification of the step-down switching circuit in which the connection mode of the switching circuit units is varied.

The number of the switching circuit units and the connection mode (serial connection or parallel connection) of the switching circuit units may be appropriately varied. FIG. 13 and FIG. 14 illustrate exemplary modifications of the step-down switching circuits in which the connection mode of the switching circuit units is varied. As illustrated in FIG. 13, a step-down switching circuit 3A may have a configuration in which the switching circuit units 11, 12, 13, and 14 are connected in parallel to each other. As illustrated in FIG. 14, a step-down switching circuit 3B may have a configuration in which the switching circuit units 11 and 12 connected in series to each other are connected to the switching circuit units 13 and 14 connected in series to each other in opposite phase relationship.

Fourth Embodiment

Figure 15:
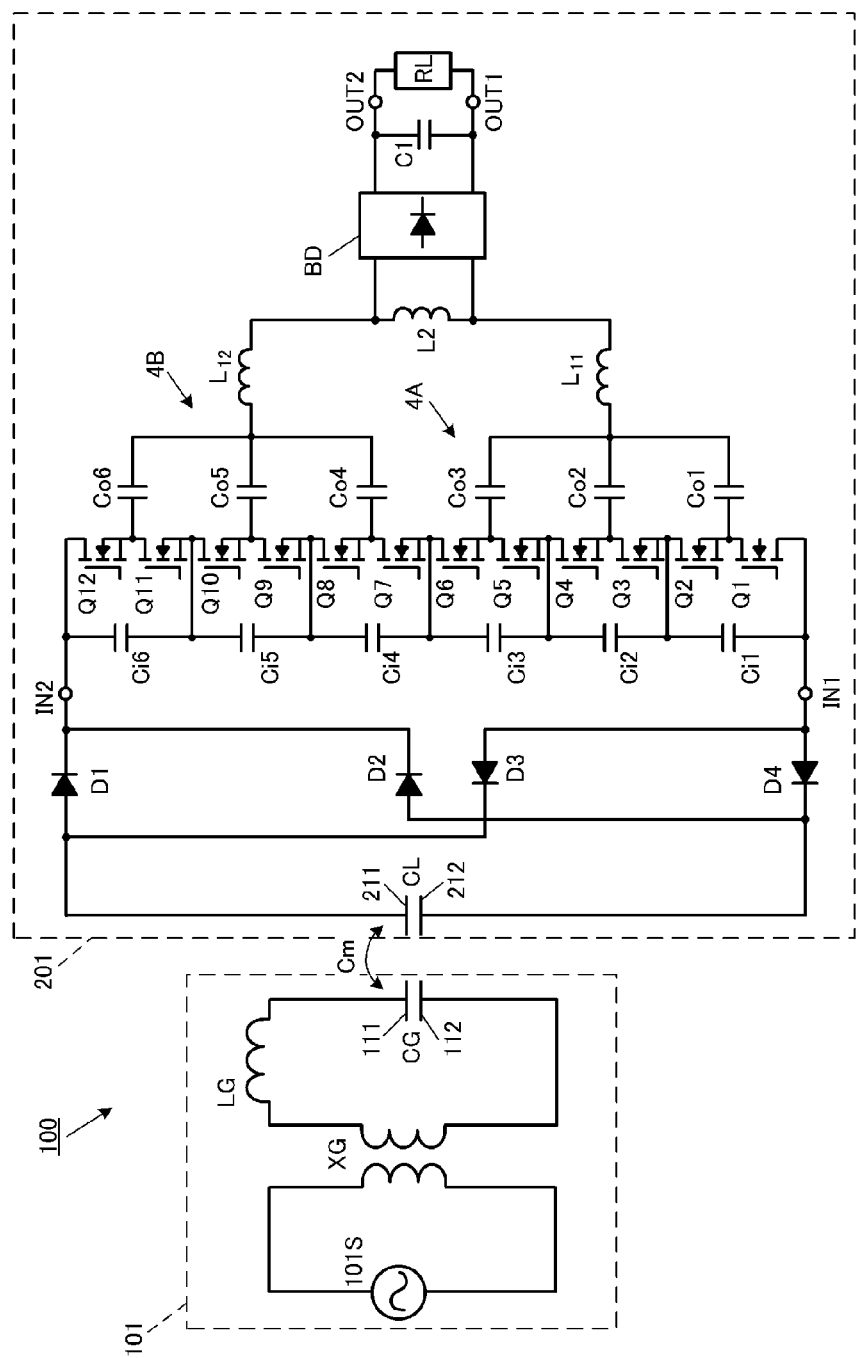
FIG. 15 is a circuit diagram of a wireless power transmission system according to a fourth embodiment.

A wireless power transmission system including a step-down switching circuit according to the present invention will be described in a fourth embodiment. FIG. 15 is a circuit diagram of a wireless power transmission system 100 according to the fourth embodiment.

The wireless power transmission system 100 includes a power transmission apparatus 101 and a power reception apparatus 201. The power reception apparatus 201 is, for example, a portable electronic device provided with a secondary cell. The portable electronic device is, for example, a cellular phone, a personal digital assistant (PDA), a portable music player, a notebook personal computer (PC), or a digital camera. The power transmission apparatus 101 is a charge stand on which the power reception apparatus 201 is mounted and which wirelessly transmits power to the power reception apparatus 201 to charge the secondary cell of the power reception apparatus 201 with the power.

The power transmission apparatus 101 includes an active electrode 111 and a passive electrode 112 and the power reception apparatus 201 includes an active electrode 211 and a passive electrode 212. The active electrode 111 is opposed to the active electrode 211 with a gap interposed therebetween and the passive electrode 112 is opposed to the passive electrode 212 with a gap interposed therebetween when the power reception apparatus 201 is mounted on the power transmission apparatus 101.

A high-frequency voltage generation circuit 1015 in the power transmission apparatus 101 generates high-frequency voltage of, for example, 100 kHz to several tens MHz. A step-up circuit composed of a step-up transformer XG and an inductor LG increases the voltage generated by the high-frequency voltage generation circuit 1015 and applies the voltage between the active electrode 111 and the passive electrode 112. A capacitor CG is mainly a capacitance generated between the active electrode 111 and the passive electrode 112 in the power transmission apparatus 101. The inductance and the capacitance of the step-up circuit compose a resonant circuit.

The step-down switching circuit is connected between the active electrode 211 and the passive electrode 212 in the power reception apparatus 201 with a diode bridge composed of diodes D1, D2, D3, and D4 interposed therebetween. The step-down switching circuit includes switching circuit units 4A and 4B. The switching circuit unit 4A has the same configuration as that of the switching circuit unit 4B.

The switching circuit unit 4A (4B) includes low-side switching elements Q1, Q3, and Q5 (Q7, Q9, and Q11), high-side switching elements Q2, Q4, and Q6 (Q8, Q10, and Q12), input-side capacitors Ci1, Ci2, and Ci3 (Ci4, Ci5, and Ci6), and output-side capacitors Co1, Co2, and Co3 (Co4, Co5, and Co6).

The switching circuit unit 4A (4B) is connected to the output terminals OUT1 and OUT2 via the output-side inductor $L_{11}$ ($L_{12}$), the bridge diode BD, and the capacitor C1. The low-side switching elements Q1, Q3, and Q5 in the switching circuit unit 4A and the high-side switching elements Q8, Q10, and Q12 in the switching circuit unit 4B are simultaneously turned on and off. The high-side switching elements Q2, Q4, and Q6 in the switching circuit unit 4A and the low-side switching elements Q7, Q9, and Q11 in the switching circuit unit 4B are simultaneously turned on and off. The switching circuit unit 4A outputs positive voltage of alternating-current voltage and the switching circuit unit 4B outputs negative voltage of alternating-current voltage.

A capacitor CL is mainly a capacitance generated between the active electrode 211 and the passive electrode 212. The load RL connected to the output terminals OUT1 and OUT2 is a secondary cell provided with a charge control circuit in the present embodiment.

A coupling electrode composed of the active electrode 111 and the passive electrode 112 in the power transmission apparatus 101 is capacitively coupled to a coupling electrode composed of the active electrode 211 and the passive electrode 212 in the power reception apparatus 201 with mutual capacitance Cm.

When the power reception apparatus 201 is mounted on the power transmission apparatus 101 in the wireless power transmission system 100 having the above configuration, the active electrode 111 is opposed to the active electrode 211 and the passive electrode 112 is opposed to the passive electrode 212. Application of voltage to the active electrode 111 and the passive electrode 112 generates an electric field between the active electrodes 111 and 211 opposed to each other and between the passive electrodes 112 and 212 opposed to each other, and power is transmitted from the power transmission apparatus 101 to the power reception apparatus 201 through the electric field.

In the power reception apparatus 201, the voltage transmitted from the power transmission apparatus 101 is reduced by the step-down switching circuit. The secondary cell (the load RL) in the power reception apparatus 201 is charged with the power. Since the power reception apparatus 201 does not use the step-down transformer, as described above, the reduction in size and the low profile of the power reception apparatus 201 are realized. In addition, high conversion efficiency is achieved in the power reception apparatus 201.

Furthermore, in the example in FIG. 15, the peak value of the output voltage from the switching circuit units 4A and 4B is lower than those in the first to third embodiments. Accordingly, it is not necessary to increase the width of the wiring.

Figure 16:
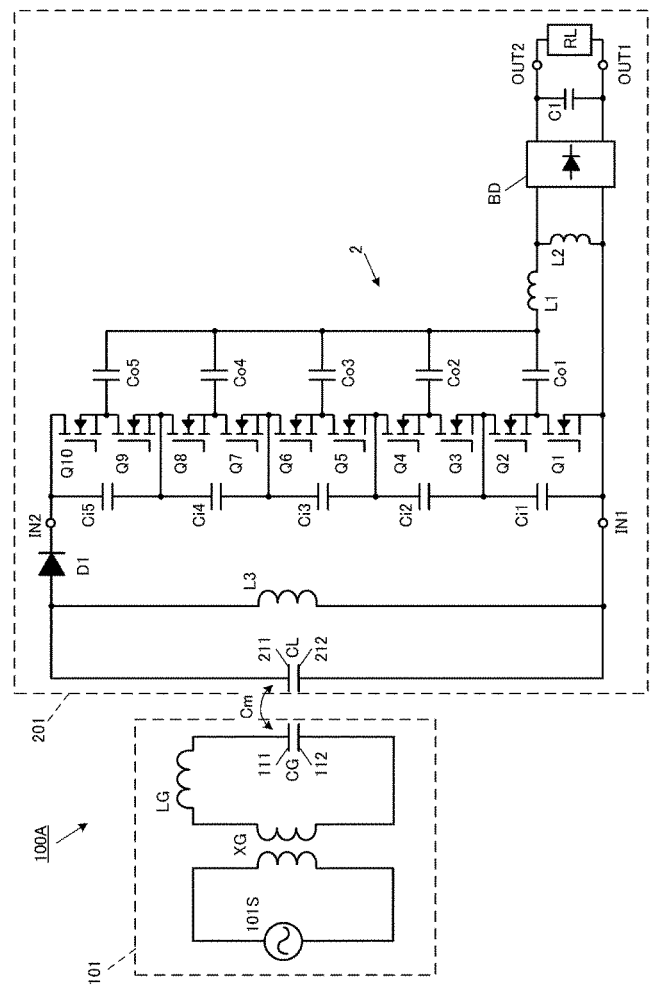
FIG. 16 illustrates an exemplary modification of the wireless power transmission system according to the fourth embodiment.

FIG. 16 illustrates an exemplary modification of the wireless power transmission system according to the fourth embodiment. In a wireless power transmission system 100A in FIG. 16, a diode D1 is connected between the active electrode 211 and the input terminal IN2, instead of the diode bridge in FIG. 15, and an inductor L3 serving as a path of direct-current current is connected between an anode of the diode D1 and the input terminal IN1 in the step-down switching circuit 2. The inductor L3 composes a resonant circuit with the capacitor CL, which is the capacitance generated between the active electrode 211 and the passive electrode 212. The step-down switching circuit connected to the input terminals IN1 and IN2 in this example has the same configuration as that of the step-down switching circuit according to the second embodiment illustrated in FIG. 8. Accordingly, it is possible to increase the power transmission efficiency from the power transmission apparatus 101 to the power reception apparatus 201.

The step-down switching circuits 1, 1A, 2, 2A, 3, 3A, and 3B described in the first to third embodiments may be used in the power reception apparatus 201 in the wireless power transmission system described in the present embodiment.

Fifth Embodiment

A power conversion system according to the present invention will be described in a fifth embodiment.

Figure 17:
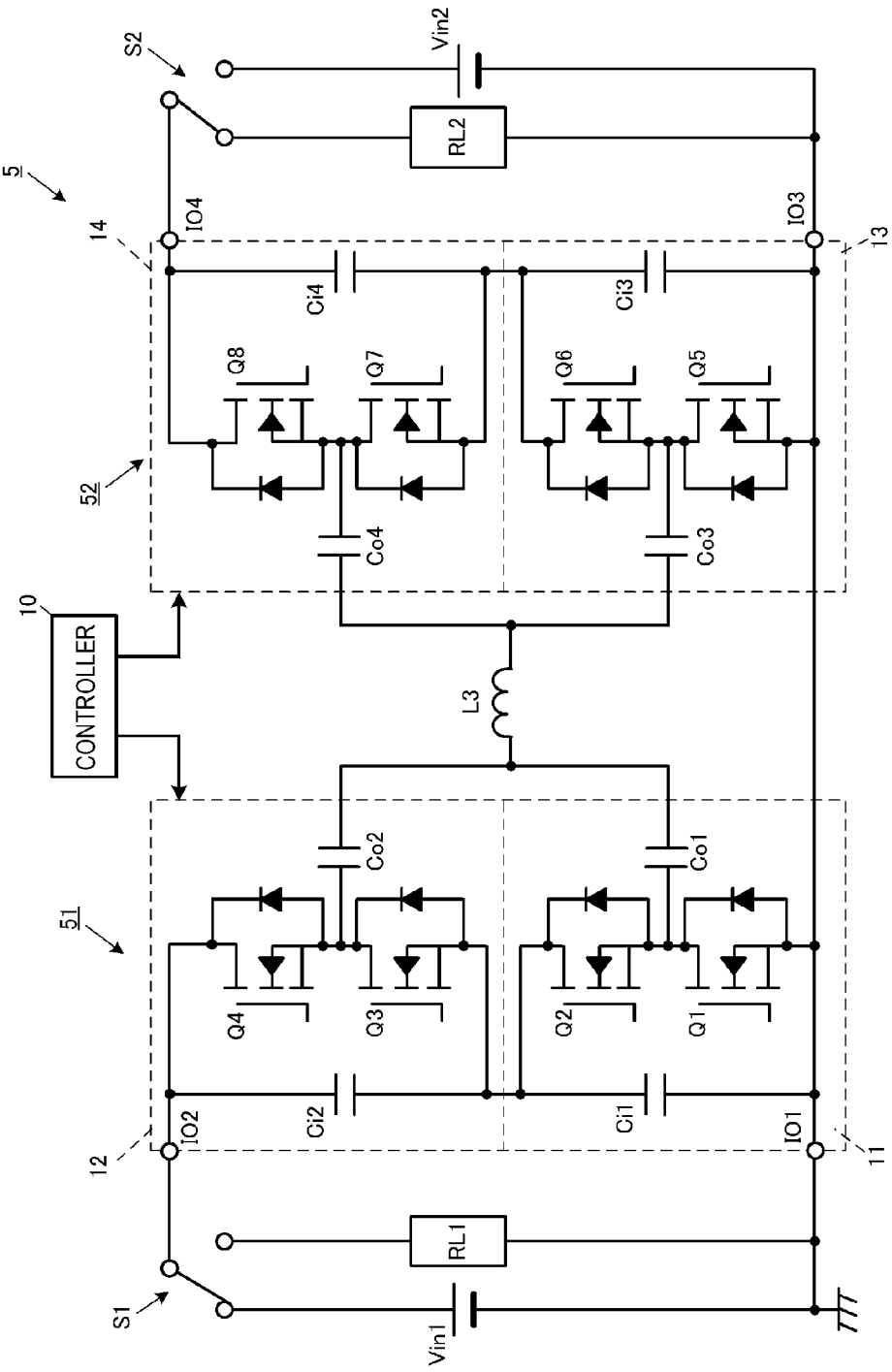
FIG. 17 is a circuit diagram of a power conversion system according to a fifth embodiment.

FIG. 17 is a circuit diagram of a power conversion system 5 according to the fifth embodiment. The power conversion system 5 includes a step-down switching circuit 51 including the switching circuit units 11 and 12 and a step-down switching circuit 52 including the switching circuit units 13 and 14. The step-down switching circuit 51 is connected to the step-down switching circuit 52 via the inductor L3. A voltage source Vin1 and a load RL1 are connected to an input-output terminal IO1 of the step-down switching circuit 51. A switch S1 is connected to an input-output terminal IO2 of the step-down switching circuit 51. The switch S1 is switched to connect the input-output terminal IO2 to either of the voltage source Vin1 and the load RL1.

A voltage source Vin2 and a load RL2 are connected to an input-output terminal IO3 of the step-down switching circuit 52. A switch S2 is connected to an input-output terminal IO4 of the step-down switching circuit 52. The switch S2 is switched to connect the input-output terminal IO4 to either of the voltage source Vin2 and the load RL2.

An operation in the above configuration will now be described, taking a case in which the input-output terminal IO2 is connected to the voltage source Vin1 at the step-down switching circuit 51 side and the input-output terminal IO4 is connected to the load RL2 at the step-down switching circuit 52 side as an example. In this example, the low-side switching elements Q1 and Q3 and the high-side switching elements Q2 and Q4 are alternately turned on and off. At this time, the current flows in the same manner as in the first embodiment described above with reference to FIG. 2 to FIG. 4.

At the step-down switching circuit 52 side, the switching elements Q5 to Q8 are constantly turned off. Rectification and smoothing are performed by the body diodes of the switching elements Q5 to Q8 and the input-side capacitors Ci3 and Ci4 and direct-current voltage is supplied to the load RL2. The switching elements Q5 to Q8 at the step-down switching circuit 52 side may be synchronized with the switching control at the step-down switching circuit 51 side. An external diode may be used without using the body diodes. In this case, it is possible to reduce the loss.

Alternately turning on and off the low-side switching elements Q5 and Q7 and the high-side switching elements Q6 and Q8 when the input-output terminal IO4 is connected to the voltage source Vin1 at the step-down switching circuit 52 side and the input-output terminal IO2 is connected to the load RL1 at the step-down switching circuit 51 side allows voltage that is subjected to rectification and smoothing to be supplied to the load RL1.

As described above, the step-down switching circuits according to the present embodiment are capable of being used as bidirectional circuits. Since it is possible to avoid increase in voltage applied to the low-side switching elements and the high-side switching elements in the power conversion system 5, it is not necessary to use a high-voltage element. Accordingly, it is possible to reduce the cost.

Although the step-down switching circuits 51 and 52 each include the two switching circuit units in the present embodiment, the step-down switching circuits 51 and 52 may each include three or more switching circuit units. The switching circuit units may be connected in parallel to the input terminals.

Sixth Embodiment

A power conversion system according to the present invention will be described in a sixth embodiment, as in the fifth embodiment.

Figure 18:
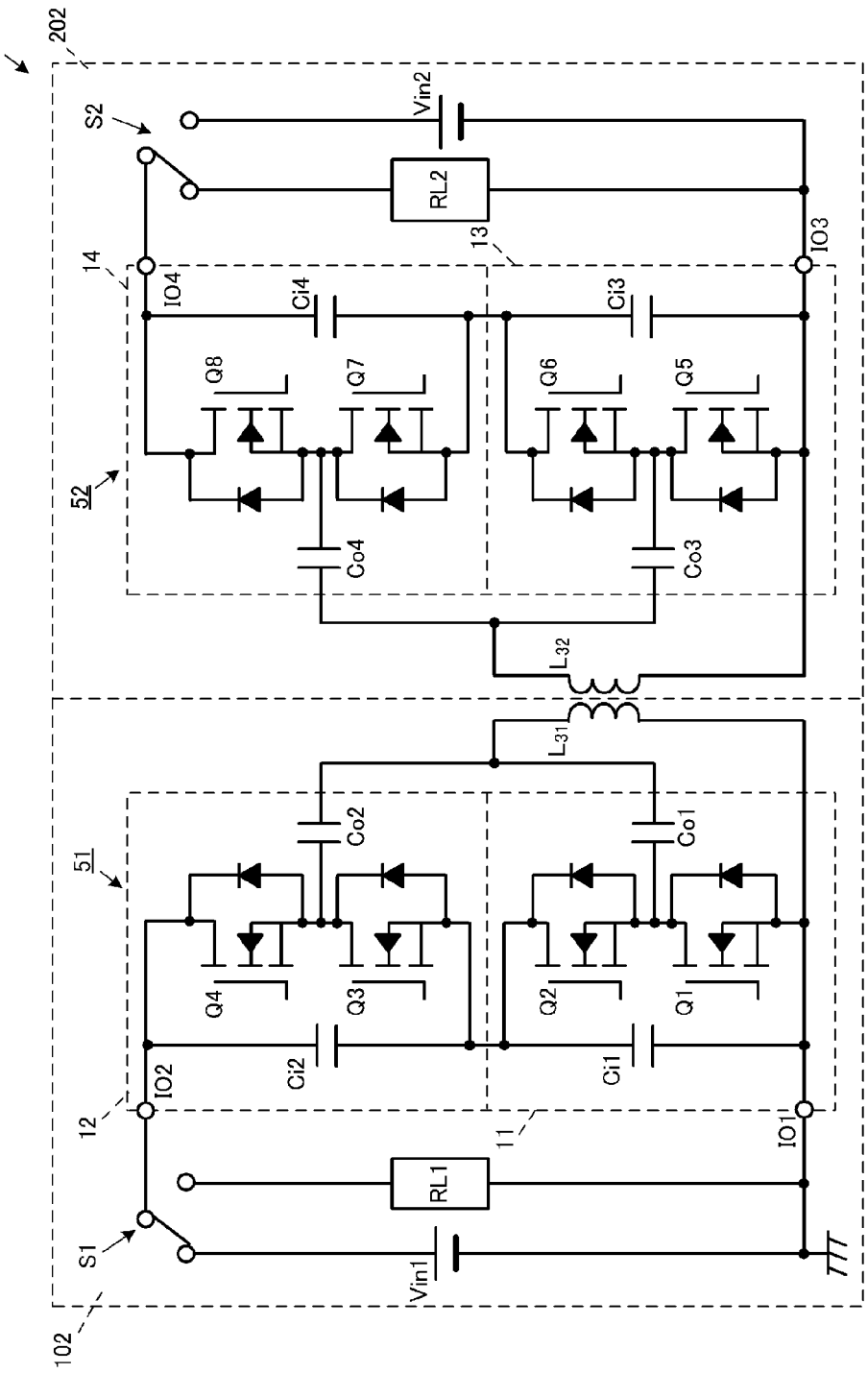
FIG. 18 is a circuit diagram of a power conversion system according to a sixth embodiment.

FIG. 18 is a circuit diagram of a power conversion system 6 according to the sixth embodiment. The power conversion system 6 in the example in FIG. 18 includes a power transmission-reception apparatus 102 and a power transmission-reception apparatus 202. Power is transmitted from the power transmission-reception apparatus 102 to the power transmission-reception apparatus 202 or from the power transmission-reception apparatus 202 to the power transmission-reception apparatus 102.

The power transmission-reception apparatuses 102 and 202 include the step-down switching circuits 51 and 52, respectively. Each of the power transmission-reception apparatuses 102 and 202 includes a controller (not illustrated) and the controller performs the switching control of the step-down switching circuits 51 and 52.

The step-down switching circuit 51 is composed of the two switching circuit units 11 and 12. The step-down switching circuit 51 is connected to either of the voltage source Vin1 and the load RL1 by switching the switch S1, as in the fifth embodiment. A coil $L_{31}$ is connected between an output portion of the step-down switching circuit 51 and the input-output terminal IO1 of the step-down switching circuit 51.

The step-down switching circuit 52 is composed of the two switching circuit units 13 and 14. The step-down switching circuit 52 is connected to either of the voltage source Vin1 and the load RL2 by switching the switch S2, as in the fifth embodiment. A coil $L_{32}$ is connected between an output portion of the step-down switching circuit 52 and the input-output terminal IO3 of the step-down switching circuit 52.

The coil $L_{31}$ of the step-down switching circuit 51 is magnetically coupled to the coil $L_{32}$ of the step-down switching circuit 52 to wirelessly transmit power from the power transmission-reception apparatus 102 to the power transmission-reception apparatus 202 (or from the power transmission-reception apparatus 202 to the power transmission-reception apparatus 102). When the power is transmitted from the power transmission-reception apparatus 102 to the power transmission-reception apparatus 202, the step-down switching circuit 52 in the power transmission-reception apparatus 202 functions as a rectifier circuit. When the power is transmitted from the power transmission-reception apparatus 202 to the power transmission-reception apparatus 102, the step-down switching circuit 51 in the power transmission-reception apparatus 102 functions as a rectifier circuit.

Since the provision of the step-down switching circuits 51 and 52 in the power transmission-reception apparatuses 102 and 202, respectively, avoids increase in voltage applied to the low-side switching elements and the high-side switching elements, it is not necessary to use a high-voltage element. Accordingly, it is possible to reduce the cost. In addition, since the voltage applied to each switching element is low, it is possible to drive the power conversion system 6 at low voltage amplitude at high speed and the power conversion system 6 is appropriate for high-frequency driving. The rectification using the switching elements with the diodes, as described in fifth embodiment, allows the rectifier circuit to achieve the high efficiency. The addition of the switches for switching between loads and the power sources allows the bidirectional power transmission.

Although the step-down switching circuits 51 and 52 each include the two switching circuit units in the present embodiment, the step-down switching circuits 51 and 52 may each include three or more switching circuit units. The switching circuit units may be connected in parallel to the input terminals or the output terminals.

Figure 19:
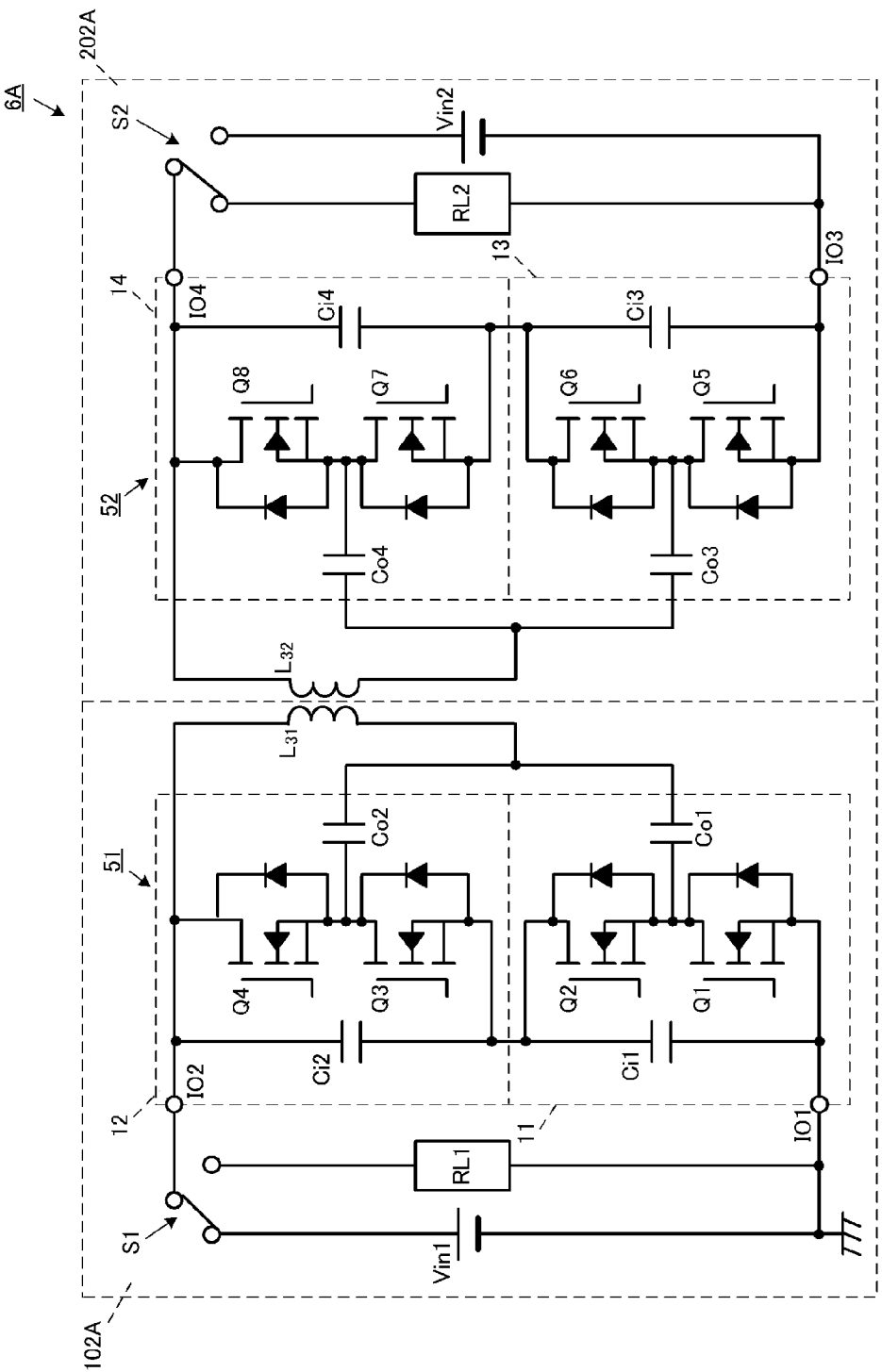
FIG. 19 is a circuit diagram of another example of the power conversion system according to the sixth embodiment.

FIG. 19 is a circuit diagram of another example of the power conversion system 6 according to the sixth embodiment. A power conversion system 6A illustrated in FIG. 19 includes power transmission-reception apparatuses 102A and 202A. In the power transmission-reception apparatus 102A, the coil $L_{31}$ is connected between the output portion of the step-down switching circuit 51 and the input-output terminal IO2 of the step-down switching circuit 51. In The power transmission-reception apparatus 202A, the coil $L_{32}$ is connected between the output portion of the step-down switching circuit 52 and the input-output terminal IO4 of the step-down switching circuit 52. The coil $L_{31}$ is magnetically coupled to the coil $L_{32}$ to wirelessly transmit power from the power transmission-reception apparatus 102A to the power transmission-reception apparatus 202A (or from the power transmission-reception apparatus 202A to the power transmission-reception apparatus 102A).

Seventh Embodiment

Figure 20:
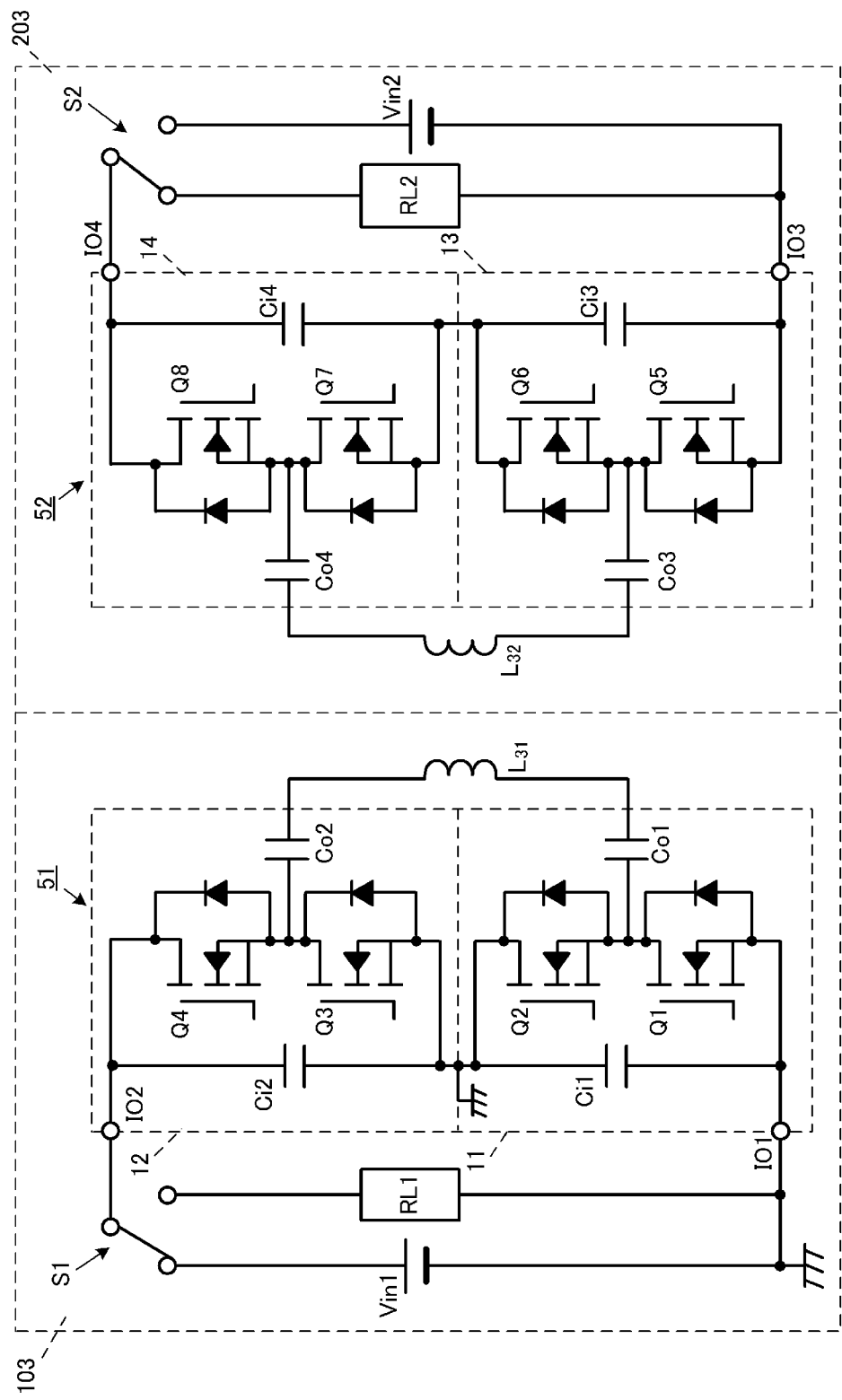
FIG. 20 is a circuit diagram of a power conversion system according to a seventh embodiment.

FIG. 20 is a circuit diagram of a power conversion system 7 according to a seventh embodiment. The power conversion system 7 in the example in FIG. 20 includes a power transmission-reception apparatus 103 and a power transmission-reception apparatus 203. As in the sixth embodiment, power is transmitted from the power transmission-reception apparatus 103 to the power transmission-reception apparatus 203 or from the power transmission-reception apparatus 203 to the power transmission-reception apparatus 103.

In the power transmission-reception apparatus 103, the coil $L_{31}$ is connected between the output-side capacitors Co1 and Co2. In the power transmission-reception apparatus 203, the coil $L_{32}$ is connected between the output-side capacitors Co3 and Co4. The coil $L_{31}$ is magnetically coupled to the coil $L_{32}$ to wirelessly transmit power from the power transmission-reception apparatus 103 to the power transmission-reception apparatus 203 (or from the power transmission-reception apparatus 203 to the power transmission-reception apparatus 103). In this case, since the step-down switching circuits 51 in the power transmission-reception apparatus 103 has a configuration symmetrical to that of the step-down switching circuit 52 in the power transmission-reception apparatus 203, it is possible to reduce the noise to stabilize the operation, compared with an asymmetric circuit configuration.

The power transmission-reception apparatuses in the power conversion systems described above in the sixth and seventh embodiments may be combined to configure a power conversion system. For example, the power conversion system may have a configuration including the power transmission-reception apparatus 102 illustrated in FIG. 18 and the power transmission-reception apparatus 202A illustrated in FIG. 19. The power conversion system may have a configuration including the power transmission-reception apparatus 103 illustrated in FIG. 20 and the power transmission-reception apparatus 202 illustrated in FIG. 18. The power conversion system may have a configuration including the power transmission-reception apparatus 102A illustrated in FIG. 19 and the power transmission-reception apparatus 203 illustrated in FIG. 20. The combination of the power transmission-reception apparatuses in the power conversion system may be appropriately varied.

REFERENCE SIGNS LIST 1, 1A, 2, 2A, 3, 3A, 3B step-down switching circuit
5, 6, 6A, 7 power conversion system
10 controller (switching control unit)
11 switching circuit unit (first three-terminal switching circuit)
12 switching circuit unit (second three-terminal switching circuit)
13 switching circuit unit (third three-terminal switching circuit)
14 switching circuit unit (fourth three-terminal switching circuit)
15 switching circuit unit
100, 100A wireless power transmission system
101 power transmission apparatus
102, 102A, 103 power transmission-reception apparatus
201 power reception apparatus
202, 202A, 203 power transmission-reception apparatus
C1 capacitor
Ci1, Ci2, Ci3, Ci4, Ci5 input-side capacitor
Co1, Co2, Co3, Co4, Co5 output-side capacitor (DC cut element)
L1 output-side inductor (inductive impedance element)
L2, L3 inductor
$L_{31}$, $L_{32}$ coil
Q1, Q3, Q5, Q7, Q9 low-side switching element
Q2, Q4, Q6, Q8, Q10 high-side switching element
IN1, IN2 input terminal (first input terminal, second input terminal)
OUT1, OUT2 output terminal (first output terminal, second output terminal)
IO1, IO2, IO3, IO4 input-output terminal (first input-output terminal, second input-output terminal, third input-output terminal, fourth input-output terminal)
BD1, BD2 diode (bootstrap circuit)
BC1, BC2 capacitor (bootstrap circuit)
Drv1, Drv2 driver
RL load
RL1 load (first load)
RL2 load (second load)

The invention claimed is:
1. A power conversion circuit comprising:
a first input terminal and a second input terminal;
a plurality of three-terminal switching circuits connected in series or in parallel between the first and second input terminals, each three-terminal switching circuit including a first input, a second input, and an output;
an inductive impedance element connected between the outputs of the three-terminal switching circuits and a load; and
a switching controller configured to control switching of the three-terminal switching circuits,
wherein each three-terminal switching circuit includes:
an input-side capacitor connected between the first and second inputs;
a series circuit that is connected in parallel to the input-side capacitor and includes a high-side switching element and a low-side switching element; and
a DC cut element connected between the high-side and low-side switching elements and the output, and
wherein the switching controller is configured to alternately turn on and off the high-side and low-side switching elements in each of the three-terminal switching circuits.

2. The power conversion circuit according to claim 1, wherein the switching controller is further configured to synchronously turn on and off the high-side switching elements in each of the series circuits and synchronously turns off and on the low-side switching elements in each of the series circuits.

3. The power conversion circuit according to claim 1, wherein each of the high-side switching elements and the low-side switching elements is a MOSFET,
wherein the high-side switching element includes a high-side diode that causes current to flow from a source to a drain of the high-side switching element and the low-side switching element includes a low-side diode that causes current to flow from a source to a drain of the low-side switching element, and
wherein the switching controller is further configured to perform zero voltage switching driving of the high-side and low-side switching elements.

4. The power conversion circuit according to claim 1, wherein each of the high-side and low-side switching elements is an n-type MOSFET, and
wherein each three-terminal switching circuit includes a driver circuit connected to a gate of the high-side switching element and a bootstrap circuit configured to supply a drive voltage to the driver circuit.

5. The power conversion circuit according to claim 1, wherein the high-side switching element is a p-type MOSFET and the low-side switching element is an n-type MOSFET.

6. A power transmission system that wirelessly transmits power from a power transmission apparatus to a power reception apparatus through electric-field coupling between a power-transmission-side first electrode and a power-transmission-side second electrode in the power transmission apparatus and a power-reception-side first electrode and a power-reception-side second electrode in the power reception apparatus, respectively,
wherein the power reception apparatus includes the power conversion circuit according to claim 1, and
wherein the power conversion circuit converts power induced in the power-reception-side first electrode and the power-reception-side second electrode in the power reception apparatus and supplies the power to the load.

\* \* \* \* \*